(12) United States Patent
Kahlen et al.

(10) Patent No.: US 11,945,926 B2
(45) Date of Patent: Apr. 2, 2024

(54) FOAMED POLYPROPYLENE COMPOSITION

(71) Applicants: BOREALIS AG, Vienna (AT); ABU DHABI POLYMERS CO. LTD (BOROUGE) LLC., Abu Dhabi (AE)

(72) Inventors: Susanne Kahlen, Linz (AT); Daniela Mileva, Linz (AT); Georg Grestenberger, Linz (AT); Andreas Fuchs, Linz (AT); Stefanie Engleder, Linz (AT); Jürgen Huber, Linz (AT); Shengquan Zhu, Shanghai (CN)

(73) Assignees: Abu Dhabi Polymers Co. Ltd (Borouge) LLC., Abu Dhabi (AE); Borealis AG, Vienna (AT)

(*) Notice: Subject to any disclaimer, the term of this patent is extended or adjusted under 35 U.S.C. 154(b) by 530 days.

(21) Appl. No.: 17/050,550

(22) PCT Filed: May 14, 2019

(86) PCT No.: PCT/EP2019/062337
§ 371 (c)(1),
(2) Date: Oct. 26, 2020

(87) PCT Pub. No.: WO2019/219678
PCT Pub. Date: Nov. 21, 2019

(65) Prior Publication Data
US 2021/0238376 A1    Aug. 5, 2021

(30) Foreign Application Priority Data

May 16, 2018  (CN) .......................... 201810468419.8

(51) Int. Cl.
| | |
|---|---|
| *C08J 9/00* | (2006.01) |
| *C08J 9/08* | (2006.01) |
| *C08K 3/34* | (2006.01) |
| *C08L 23/06* | (2006.01) |
| *C08L 23/08* | (2006.01) |
| *C08L 23/12* | (2006.01) |
| *C08L 23/16* | (2006.01) |

(52) U.S. Cl.
CPC .............. *C08J 9/0061* (2013.01); *C08J 9/08* (2013.01); *C08K 3/34* (2013.01); *C08L 23/06* (2013.01); *C08L 23/0815* (2013.01); *C08L 23/12* (2013.01); *C08L 23/16* (2013.01); *C08J 2203/02* (2013.01); *C08J 2323/12* (2013.01); *C08L 2205/025* (2013.01); *C08L 2205/035* (2013.01); *C08L 2205/22* (2013.01); *C08L 2207/02* (2013.01); *C08L 2207/062* (2013.01)

(58) Field of Classification Search
CPC ........ C08J 9/0061; C08J 9/08; C08J 2203/02; C08J 2323/12; C08J 9/00; C08J 9/0066; C08J 2323/14; C08J 2423/06; C08J 2423/08; C08J 2423/14; C08K 3/34; C08K 3/04; C08L 23/06; C08L 23/0815; C08L 23/12; C08L 23/16; C08L 2205/025; C08L 2205/035; C08L 2205/22; C08L 2207/02; C08L 2207/062

See application file for complete search history.

(56) References Cited

U.S. PATENT DOCUMENTS

| | | | |
|---|---|---|---|
| 5,272,236 A | 12/1993 | Lai et al. | |
| 9,637,602 B2 | 5/2017 | Potter et al. | |
| 9,670,293 B2 | 6/2017 | Reznichenko et al. | |
| 9,670,347 B2 | 6/2017 | Tölsch et al. | |
| 9,708,481 B2 | 7/2017 | Wang et al. | |
| 9,745,431 B2 | 8/2017 | Potter et al. | |
| 9,751,962 B2 | 9/2017 | Wang et al. | |
| 9,777,142 B2 | 10/2017 | Sandholzer et al. | |
| 9,802,394 B2 | 10/2017 | Cavacas et al. | |
| 9,828,698 B2 | 11/2017 | Wang et al. | |
| 9,890,275 B2 | 2/2018 | Sandholzer et al. | |
| 9,976,020 B2 | 5/2018 | Nummila-Pakarinen et al. | |
| 10,011,708 B2 | 7/2018 | Lampela et al. | |
| 10,030,109 B2 | 7/2018 | Boragno et al. | |
| 10,040,930 B2 | 8/2018 | Gloger et al. | |
| 10,100,185 B2 | 10/2018 | Wang et al. | |
| 10,100,186 B2 | 10/2018 | Wang et al. | |
| 10,227,427 B2 | 3/2019 | Reichelt et al. | |
| 10,450,451 B2 | 10/2019 | Wang et al. | |
| 10,519,259 B2 | 12/2019 | Resconi et al. | |
| 10,870,718 B2 | 12/2020 | Denifl et al. | |
| 11,292,900 B2 | 4/2022 | Gahleitner et al. | |
| 11,299,617 B2 | 4/2022 | Prieto et al. | |

(Continued)

FOREIGN PATENT DOCUMENTS

| | | |
|---|---|---|
| AU | 4076495 A | 7/1996 |
| CN | 103080212 A | 5/2013 |

(Continued)

OTHER PUBLICATIONS

Hydrocerol CF 40 E Technical product information (Year: 2003).*
China National Intellectual Property Administration, First Office Action in Chinese Patent Application No. 201980028944.0 (dated Jun. 22, 2022).
U.S. Appl. No. 16/973,673, filed Dec. 9, 2020.
U.S. Appl. No. 17/273,687, filed Mar. 4, 2021.
U.S. Appl. No. 17/273,700, filed Mar. 4, 2021.
U.S. Appl. No. 17/273,711, filed Mar. 4, 2021.
U.S. Appl. No. 17/276,275, filed Mar. 15, 2021.
U.S. Appl. No. 17/276,322, filed Mar. 15, 2021.
U.S. Appl. No. 17/413,612, filed Jun. 14, 2021.

(Continued)

*Primary Examiner* — Irina S Zemel
(74) *Attorney, Agent, or Firm* — Leydig, Voit & Mayer, Ltd.

(57) ABSTRACT

The present invention is directed to a polypropylene composition (C) a melt flow rate MFR$_2$ (230° C.) determined according to ISO 1133 in the range of 15 to 40 g/10 min, the use of said polypropylene composition (C) for the production of a foamed article and a foamed article comprising said polypropylene composition (C).

13 Claims, 1 Drawing Sheet

(56) References Cited

U.S. PATENT DOCUMENTS

| | | | |
|---|---|---|---|
| 11,390,732 | B2 | 7/2022 | Van Houcke et al. |
| 2001/0036975 | A1 | 11/2001 | Park et al. |
| 2006/0211812 | A1 | 9/2006 | Natsuyama et al. |
| 2010/0240784 | A1 | 9/2010 | Moscardi et al. |
| 2011/0233449 | A1 | 9/2011 | Lunghi et al. |
| 2013/0123413 | A1 | 5/2013 | Lederer et al. |
| 2016/0185946 | A1 | 6/2016 | Sandholzer et al. |
| 2016/0194486 | A1 | 7/2016 | Sandholzer et al. |
| 2016/0200838 | A1 | 7/2016 | Reznichenko et al. |
| 2016/0208085 | A1 | 7/2016 | Gloger et al. |
| 2016/0229158 | A1 | 8/2016 | Cavacas et al. |
| 2016/0237270 | A1 | 8/2016 | Wang et al. |
| 2016/0244539 | A1 | 8/2016 | Resconi et al. |
| 2016/0272740 | A1 | 9/2016 | Wang et al. |
| 2016/0280899 | A1 | 9/2016 | Töltsch et al. |
| 2016/0304681 | A1 | 10/2016 | Potter et al. |
| 2016/0311951 | A1 | 10/2016 | Reichelt et al. |
| 2016/0311988 | A1 | 10/2016 | Potter et al. |
| 2016/0312018 | A1 | 10/2016 | Vestberg et al. |
| 2016/0312019 | A1 | 10/2016 | Lampela et al. |
| 2016/0347943 | A1 | 12/2016 | Wang et al. |
| 2016/0347944 | A1 | 12/2016 | Wang et al. |
| 2017/0009068 | A1 | 1/2017 | Kahlen et al. |
| 2017/0029980 | A1 | 2/2017 | Wang et al. |
| 2017/0137617 | A1 | 5/2017 | Wang et al. |
| 2017/0166711 | A1 | 6/2017 | Boragno et al. |
| 2017/0218172 | A1 | 8/2017 | Wang et al. |
| 2017/0313867 | A1 | 11/2017 | Lampela et al. |
| 2017/0321048 | A1 | 11/2017 | Nummila-Pakarinen et al. |
| 2018/0079875 | A1 | 3/2018 | Braun et al. |
| 2018/0194881 | A1 | 7/2018 | Denifl et al. |
| 2020/0263015 | A1 | 8/2020 | Kniesel et al. |
| 2020/0270434 | A1 | 8/2020 | Van Houcke et al. |
| 2020/0277479 | A1 | 9/2020 | Jerabek et al. |
| 2020/0308353 | A1 | 10/2020 | Jerabek et al. |
| 2020/0347216 | A1 | 11/2020 | Kniesel et al. |
| 2020/0392321 | A1 | 12/2020 | Gahleitner et al. |
| 2021/0114352 | A1 | 4/2021 | Oderkerk et al. |
| 2021/0171749 | A1 | 6/2021 | Kumar et al. |
| 2021/0171750 | A1 | 6/2021 | Gahleitner et al. |
| 2021/0214527 | A1 | 7/2021 | Gahleitner et al. |
| 2021/0214533 | A1 | 7/2021 | Kulshreshtha et al. |
| 2021/0238376 | A1 | 8/2021 | Kahlen et al. |
| 2021/0253836 | A1 | 8/2021 | Gahleitner et al. |
| 2021/0269560 | A1 | 9/2021 | Krallis et al. |
| 2021/0324189 | A1 | 10/2021 | Prieto et al. |
| 2021/0332227 | A1 | 10/2021 | Wang et al. |
| 2021/0347971 | A1 | 11/2021 | Wang et al. |
| 2022/0033631 | A1 | 2/2022 | Gloger et al. |
| 2022/0135779 | A1 | 5/2022 | Wang et al. |
| 2022/0204719 | A1 | 6/2022 | Vijay |
| 2022/0227965 | A1 | 7/2022 | Ruemer et al. |
| 2022/0251256 | A1 | 8/2022 | Wang et al. |

FOREIGN PATENT DOCUMENTS

| | | | |
|---|---|---|---|
| CN | 105705573 A | 6/2016 | |
| CN | 105745269 A | 7/2016 | |
| CN | 106317608 A | 1/2017 | |
| CN | 109983072 A | 7/2019 | |
| EA | 201500331 A1 | 8/2015 | |
| EP | 0 491 566 A2 | 6/1992 | |
| EP | 0 887 379 A1 | 12/1998 | |
| EP | 1754744 A1 * | 2/2007 | ............ C04B 38/00 |
| EP | 2 902 438 A1 | 8/2015 | |
| EP | 3 124 537 A1 | 2/2017 | |
| EP | 3 260 489 A1 | 12/2017 | |
| EP | 3 330 315 A1 | 6/2018 | |
| WO | WO 87/07620 A1 | 12/1987 | |
| WO | WO 92/12182 A1 | 7/1992 | |
| WO | WO 92/19653 A1 | 11/1992 | |
| WO | WO 92/19658 A1 | 11/1992 | |
| WO | WO 99/24478 A1 | 5/1999 | |
| WO | WO 99/24479 A1 | 5/1999 | |
| WO | WO 00/68315 A1 | 11/2000 | |
| WO | WO 2004/000899 A1 | 12/2003 | |
| WO | WO 2004/111095 A1 | 12/2004 | |
| WO | WO 2010/149529 A1 | 12/2010 | |
| WO | WO 2012/025584 A1 | 5/2013 | |
| WO | WO 2014/044683 A1 | 3/2014 | |
| WO | 2015/070360 A1 | 5/2015 | |
| WO | WO 2015/077902 A1 | 6/2015 | |
| WO | WO 2016/005301 A1 | 1/2016 | |
| WO | 2021/130139 A1 | 7/2021 | |
| WO | 2021/130140 A1 | 7/2021 | |
| WO | 2022/034125 A1 | 2/2022 | |

OTHER PUBLICATIONS

Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28:1128-1134 (2007).

Busico et al., "Full Assignment of the $^{13}$C NMR Spectra of Regioregular Polypropylenes: Methyl and Methylene Region," *Macromolecules* 30:6251-6263 (1997).

Busico et al., "Microstructure of polypropylene," *Prog. Polym. Sci.* 26:443-533 (2001).

Cheng, "$^{13}$C NMR Analysis of Ethylene-Propylene Rubbers," *Macromolecules* 17:1950-1955 (1984).

Frank et al., "GS-VIII : OP18 New Measurement Method for Appearance of Flow Marks or Tiger Stripes Defect for Improved Quantification and Analysis," PPS 25 *Intern. Conf. Polym. Proc. Soc*, Goa, India (Mar. 1-5, 2009)—Abstract only.

Kakugo et al., "$^{13}$C NMR Determination of Monomer Sequence Distribution in Ethylene-Propylene Copolymers Prepared with δ-TiCl$_3$-Al(C$_2$H$_5$)$_2$Cl," Macromolecules 15:1150-1152 (1982).

*Plastics Additives Handbook*, 6th edition, Hans Zweifel, Editor, Hanser Publishers, Munich, pp. 1141-1190 (2009).

*Plastics Additives Handbook*, 6th edition, Hans Zweifel, Editor, Hanser Publishers, Munich, pp. 967-990 (2009).

Resconi et al., "Selectivity in Propene Polymerization with Metallocene Catalysts," *Chem. Rev.* 100(4): 1253-1345 (2000).

Singh et al., "Triad sequence determination of ethylene-propylene copolymers—application of quantitative $^{13}$C NMR," Polymer Testing 28(5):475-479 (2009).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}$C NMR," *J. Magnet. Reson.* 187:225-233 (2007).

European Patent Office, International Search Report in International Application No. PCT/EP2019/062337 (dated Jul. 23, 2019).

European Patent Office, Written Opinion in International Application No. PCT/EP2019/062337 (dated Jul. 23, 2019).

International Bureau of WIPO, International Preliminary Report on Patentability in International Application No. PCT/EP2019/062337 dated (Nov. 17, 2020).

U.S. Appl. No. 14/911,295, filed Feb. 10, 2016.
U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.
U.S. Appl. No. 15/113,907, filed Jul. 25, 2016.
U.S. Appl. No. 15/113,922, filed Jul. 25, 2016.
U.S. Appl. No. 15/115,929, filed Aug. 2, 2016.

(56) References Cited

OTHER PUBLICATIONS

U.S. Appl. No. 15/310,283, filed Nov. 10, 2016.
U.S. Appl. No. 15/514,641, filed Mar. 27, 2017.
U.S. Appl. No. 15/526,957, filed May 15, 2017.
U.S. Appl. No. 15/531,974, filed May 31, 2017.
U.S. Appl. No. 15/566,588, filed Oct. 13, 2017.
U.S. Appl. No. 15/733,971, filed Dec. 1, 2020.
U.S. Appl. No. 15/741,861, filed Jan. 4, 2018.
U.S. Appl. No. 16/633,699, filed Jan. 24, 2020.
U.S. Appl. No. 16/652,115, filed Mar. 30, 2020.
U.S. Appl. No. 16/761,743, filed May 5, 2020.
U.S. Appl. No. 16/761,757, filed May 5, 2020.
U.S. Appl. No. 16/763,001, filed May 11, 2020.
U.S. Appl. No. 16/763,014, filed May 11, 2020.
U.S. Appl. No. 16/768,330, filed May 29, 2020.
U.S. Appl. No. 16/982,385, filed Sep. 18, 2020.
U.S. Appl. No. 17/047,350, filed Oct. 13, 2020.
U.S. Appl. No. 17/052,233, filed Nov. 2, 2020.
U.S. Appl. No. 17/259,216, filed Jan. 11, 2021.
U.S. Appl. No. 17/622,891, filed Dec. 27, 2021.
U.S. Appl. No. 17/623,657, filed Dec. 29, 2021.
U.S. Appl. No. 17/624,609, filed Jan. 4, 2022.
U.S. Appl. No. 17/635,764, filed Feb. 16, 2022.
U.S. Appl. No. 17/635,838, filed Feb. 16, 2022.
U.S. Appl. No. 17/635,892, filed Feb. 16, 2022.
U.S. Appl. No. 17/791,987, filed Jul. 11, 2022.
U.S. Appl. No. 17/792,003, filed Jul. 11, 2022.
Intellectual Property Corporation of Malaysia, Substantive Examination Clear Report—Section 30(1) in Malaysian Application No. PI2020004919 (Aug. 1, 2022).
Federal Institute of Industrial Property (FIPS), Request of the Substantive Examination in Russian Patent Application No. 2020138641/04(071686) (Jun. 22, 2021).
China National Intellectual Property Administration, First Office Action in Chinese Patent Application No. 201810468419.8 (dated Nov. 1, 2021).
Intellectual Property India, Examination Report in Indian Patent Application No. 202017051521 (dated Mar. 22, 2021).
Egyptian Patent Office, Technical Report in Egyptian Patent Application No. 2020091527 (dated Aug. 4, 2022).
Kim et al., "Effects of compatibility on foaming behavior of polypropylene/polyolefin elastomer blends prepared using a chemical blowing agent", *Journal of Applied Polymer Science*, pp. 1-10 (2017).
Wenxiang et al., "Research Progress of Polypropylene Foam", *Chinese Journal of Colloid & Polymer*, vol. 35(1): pp. 45-48 (2017).
China National Intellectual Property Administration, Notice of Proceeding with Registration Formalities in Chinese Patent Application No. 201810468419.8 (dated Jun. 12, 2023).
United Arab Emirates Ministry of Economy, Office Action Summary, Examination Results, and Search Report in United Arab Emirates Patent Application No. P6001524/2020 (dated Dec. 11, 2023).

\* cited by examiner

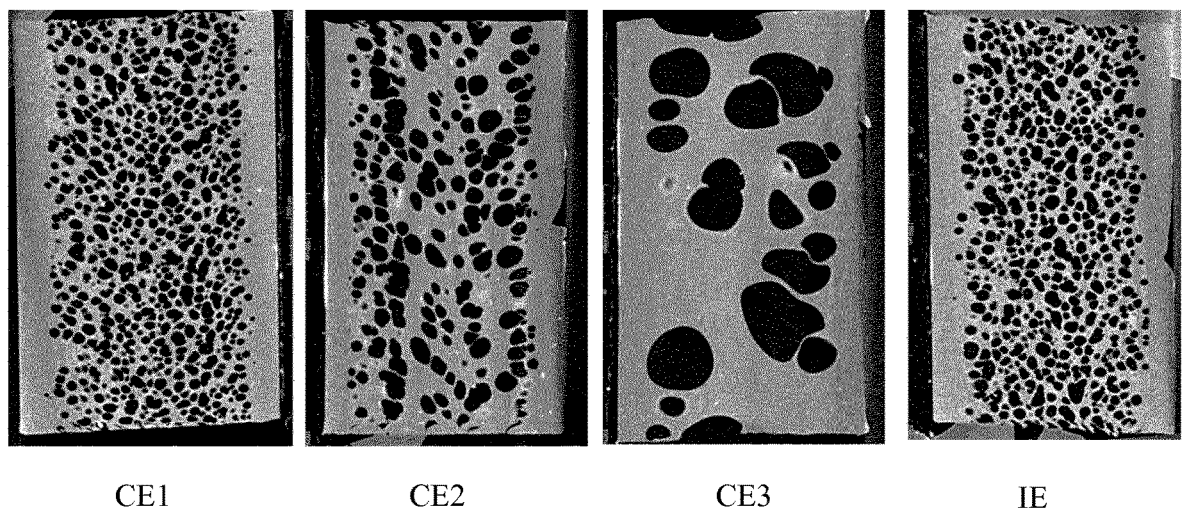
CE1　　　　　CE2　　　　　CE3　　　　　IE

FOAMED POLYPROPYLENE COMPOSITION

CROSS-REFERENCE TO RELATED APPLICATIONS

This patent application is the U.S. national phase of International Application No. PCT/EP2019/062337, filed on May 14, 2019, which claims the benefit of Chinese Patent Application No. 201810468419.8, filed May 16, 2018, the disclosures of which are incorporated herein by reference in their entireties for all purposes.

The present invention is directed to a polypropylene composition (C) a melt flow rate $MFR_2$ (230° C.) determined according to ISO 1133 in the range of 15 to 40 g/10 min, the use of said polypropylene composition (C) for the production of a foamed article and a foamed article comprising said polypropylene composition (C).

Recent demand for plastics in the automotive industry is towards weight reduction with preservation of the mechanical property profile and surface appearance. The European Union has approved tough $CO_2$ limit which mandates the car manufacturer to cut emission from current 160 to 120 g/km or below. Thus, there is a need for weight saving concepts in order to fulfil said legislation. However, the recent solutions by using inorganic filler filled or glass fibre reinforced polypropylene compounds are limited regarding density reduction. Therefore, foaming during the injection-moulding conversion step which can be applied for non-visible and visible automotive parts is considered as a possible solution to support further weight reduction. Foamed parts have the advantage of reduced density. However, such parts typically feature poor surface and sacrificed mechanical properties such that the majority of foamed parts cannot be used for visible interior/exterior applications.

Accordingly, there is a need in the art for a polypropylene composition which after a step of injection-moulding foaming is featured by homogeneous surface appearance and balanced mechanical properties together with sufficient odour and emission properties.

Therefore, it is an object of the present invention to provide a foamable polypropylene composition applicable for the preparation of a foamed article having homogeneous/good surface appearance and balanced mechanical properties together with sufficient odour and emission properties.

The finding of the present invention is to provide a polypropylene composition (C) comprising a first and second heterophasic propylene copolymer, a high density polyethylene (HDPE), a plastomer (PL) and an inorganic filler which can be chemically foamed.

Accordingly, the present invention is directed to a polypropylene composition (C) having a melt flow rate $MFR_2$ (230° C.) determined according to ISO 1133 in the range of 15 to 40 g/10 min, comprising
  a) a first heterophasic propylene copolymer (HECO1) having a melt flow rate $MFR_2$ (230° C.) determined according to ISO 1133 in the range of 50 to 200 g/10 min, said first heterophasic propylene copolymer comprising
    i) a first matrix being a first propylene polymer (M1) and
    ii) a first elastomeric propylene copolymer (E1) being dispersed in said first matrix,
  b) a second heterophasic propylene copolymer (HECO2) having a melt flow rate $MFR_2$ (230° C.) determined according to ISO 1133 in the range of 3 to <50 g/10 min, said second heterophasic propylene copolymer comprising
    iii) a second matrix being a second propylene polymer (M2) and
    iv) a second elastomeric propylene copolymer (E2) being dispersed in said second matrix,
  c) a high density polyethylene (HDPE) having a melt flow rate $MFR_2$ (190° C.) determined according to ISO 1133 in the range of 2 to 15 g/10 min,
  d) a plastomer (PL) being a copolymer of ethylene and a $C_4$ to $C_8$ α-olefin and having a melt flow rate $MFR_2$ (190° C.) determined according to ISO 1133 in the range of 10 to 70 g/10 min,
  e) an inorganic filler (F),
  f) a foaming agent (FA) comprising citric acid in combination with a bicarbonate, and
  g) optionally a nucleating agent.

It was surprisingly found that a foamed part obtained from said polypropylene composition (C) is featured by excellent surface appearance and balanced mechanical properties together with sufficient odour and emission properties. The dispersed phase of the heterophasic system can have a bimodal molecular weight distribution in order to ensure good balance between mechanics and surface appearance. Additionally, a high density polyethylene (HDPE) and other additives are added for improvement of the scratch resistance which is especially useful for interior applications. In particular, it has been found out that a foaming agent comprising citric acid in combination with a bicarbonate provides a fine cell structure and good surface properties of injection moulded foamed parts.

According to one embodiment of the present invention, the composition comprises
  a) 35.0 to 55.0 wt.-% of the first heterophasic propylene copolymer (HECO1),
  b) ≥20.0 wt.-% of the second heterophasic propylene copolymer (HECO2),
  c) 2.0 to 10.0 wt.-% of the high density polyethylene (HDPE),
  d) 5.0 to 15.0 wt.-% of the plastomer (PL) being a copolymer of ethylene and a $C_4$ to $C_8$ α-olefin,
  e) 1.0 to 20.0 wt.-% of the inorganic filler (F), and
  f) 1.0 to 10.0 wt.-% of the foaming agent,
  based on the overall polypropylene composition (C).

According to a further embodiment of the present invention, i) the matrix of the first heterophasic propylene copolymer (HECO1) being the first propylene polymer (M1) has a melt flow rate $MFR_2$ (230° C.) determined according to ISO 1133 in the range of 50 to 200 g/10 min, and ii) the matrix of the second heterophasic propylene copolymer (HECO2) being the second propylene polymer (M2) has a melt flow rate $MFR_2$ (230° C.) determined according to ISO 1133 in the range of 50 to 200 g/10 min.

According to still another embodiment of the present invention, the first heterophasic propylene copolymer (HECO1) has
  i) a xylene soluble fraction (XCS) in the range of 15.0 to 35.0 wt.-%, and/or
  ii) a xylene soluble fraction (XCS) which intrinsic viscosity (IV) is <3.5 dl/g at 135° C., and/or
  iii) a xylene soluble fraction (XCS) which ethylene content is from 30.0 to 40.0 wt.-%, based on the total weight of the xylene soluble fraction (XCS).

According to one embodiment of the present invention, the second heterophasic propylene copolymer (HECO2) has
  i) a xylene soluble fraction (XCS) in the range of 10.0 to 35.0 wt.-%, and/or
  ii) a xylene soluble fraction (XCS) which intrinsic viscosity (IV) is <4.0 dl/g at 135° C., and/or iii) a xylene soluble fraction (XCS) which ethylene content is 35.0 to 50.0 wt.-%, based on the total weight of the xylene soluble fraction (XCS).

According to another embodiment of the present invention, the first propylene polymer (M1) and/or the second propylene polymer (M2) are propylene homopolymers.

According to a further embodiment of the present invention, the first elastomeric propylene copolymer (E1) and/or the second elastomeric propylene copolymer (E2) are copolymers of propylene and ethylene.

According to still another embodiment of the present invention, the first elastomeric propylene copolymer (E1) and/or the second elastomeric propylene copolymer (E2) are copolymers of propylene and ethylene.

According to one embodiment of the present invention, the plastomer (PL) is i) a copolymer of ethylene and 1-octene, and/or
ii) has a density of below 0.900 g/cm$^3$.

According to another embodiment of the present invention, the inorganic filler (F) is talc and/or wollastonite.

According to a further embodiment of the present invention, the bicarbonate is selected from the group comprising sodium bicarbonate, potassium bicarbonate, magnesium bicarbonate, calcium bicarbonate, ammonium bicarbonate and mixtures thereof.

According to still another embodiment of the present invention, the bicarbonate is sodium bicarbonate.

According to one embodiment of the present invention, said polypropylene composition (C) is a foamable polypropylene composition.

The present invention is further directed to the use of the polypropylene composition (C) as described herein for the production of a foamed article.

Further, the present invention is directed to a foamed article, comprising the polypropylene composition (C) as described herein.

It is preferred that said foamed article is an automotive article.

In the following, the present invention is described in more detail.

The Polypropylene Composition (C)

The inventive polypropylene composition (C) comprises a first heterophasic propylene copolymer (HECO1) comprising a first matrix being a propylene polymer (M1) and a first elastomeric propylene copolymer (E1) and a second heterophasic propylene copolymer (HECO2) comprising a second matrix being a propylene polymer (M2) and a second elastomeric propylene copolymer (E2).

Accordingly, the inventive polypropylene composition (C) comprises a heterophasic system comprising a matrix (M) formed by the first propylene polymer (M1) and the second propylene polymer (M2), and the first elastomeric propylene copolymer (E1) and the second elastomeric propylene copolymer (E2) are dispersed in said matrix (M). Thus, the matrix (M) contains (finely) dispersed inclusions being not part of the matrix (M) and said inclusions contain the first elastomeric propylene copolymer (E1) and the second elastomeric propylene copolymer (E2). The term inclusion indicates that the matrix (M) and the inclusion form different phases as defined below.

It is preferred that the polypropylene composition (C) comprises from 35.0 to 55.0 wt.-% of the first heterophasic propylene copolymer (HECO1) comprising a first matrix being a propylene polymer (M1) and a first elastomeric propylene copolymer (E1), more preferably 35.0 to 50.0 wt.-%, still more preferably 35.0 to 48.0 wt.-% and most preferably 35.0 to 42.0 wt.-%, and ≥20.0 wt.-% of the second heterophasic propylene copolymer (HECO2) comprising a second matrix being a propylene polymer (M2) and a second elastomeric propylene copolymer (E2), more preferably 20.0 to <35.0 wt.-%, still more preferably 21.0 to 33.0 wt.-% and most preferably 23.0 to 30.0 wt.-%, based on the overall weight of the polypropylene composition (C).

Further, the inventive polypropylene composition comprises an inorganic filler (F).

Accordingly, it is preferred that the polypropylene composition (C) comprises 1.0 to 20.0 wt.-% of the inorganic filler (F), more preferably 2.0 to 18.0 wt.-%, still more preferably 3.0 to 16.0 wt.-%, based on the overall weight of the polypropylene composition (C).

It is a further requirement that the polypropylene composition (C) further comprises a high density polyethylene (HDPE) having a melt flow rate MFR$_2$ (190° C.) determined according to ISO 1133 in the range of 2 to 15 g/10 min and a plastomer (PL) being a copolymer of ethylene and a C$_4$ to C$_8$ α-olefin and having a melt flow rate MFR$_2$ (190° C.) determined according to ISO 1133 in the range of 10 to 70 g/10 min.

Accordingly, it is preferred that the polypropylene composition (C) comprises 2.0 to 10.0 wt.-%, more preferably 3.0 to 8.0 wt.-%, still more preferably 4.0 to 6.0 wt.-% of the high density polyethylene (HDPE) and 5.0 to 15.0 wt.-%, more preferably 6.0 to 11.0 wt.-%, still more preferably 7.0 to 9.0 wt.-% of the plastomer (PL), based on the overall weight of the polypropylene composition (C).

One essential component of the present polypropylene composition (C) is a foaming agent (FA) comprising citric acid in combination with a bicarbonate.

Accordingly, it is preferred that the polypropylene composition (C) comprises 1.0 to 10.0 wt.-%, more preferably 1.0 to 8.0 wt.-%, still more preferably 1.0 to 6.0 wt.-% of the foaming agent (FA) comprising citric acid in combination with a bicarbonate, based on the overall weight of the polypropylene composition (C).

Thus, the polypropylene composition (C) having a melt flow rate MFR$_2$ (230° C.) determined according to ISO 1133 in the range of 15 to 40 g/10 min preferably comprises a) from 35.0 to 55.0 wt.-%, based on the overall polypropylene composition (C), of the first heterophasic propylene copolymer (HECO1) having a melt flow rate MFR$_2$ (230° C.) determined according to ISO 1133 in the range of 50 to 200 g/10 min, said first heterophasic propylene copolymer comprising
  i) a first matrix being a first propylene polymer (M1) and
  ii) a first elastomeric propylene copolymer (E1) being dispersed in said first matrix,
b) ≥20.0 wt.-%, based on the overall polypropylene composition (C), of the second heterophasic propylene copolymer (HECO2) having a melt flow rate MFR$_2$ (230° C.) determined according to ISO 1133 in the range of 3 to <50 g/10 min, said second heterophasic propylene copolymer comprising
  iii) a second matrix being a second propylene polymer (M2) and
  iv) a second elastomeric propylene copolymer (E2) being dispersed in said second matrix,
c) from 2.0 to 10.0 wt.-%, based on the overall polypropylene composition (C), of the high density polyethylene (HDPE) having a melt flow rate MFR$_2$ (190° C.) determined according to ISO 1133 in the range of 2 to 15 g/10 min,
d) from 5.0 to 15.0 wt.-%, based on the overall polypropylene composition (C), of the plastomer (PL) being a copolymer of ethylene and a $C_4$ to $C_8$ α-olefin and having a melt flow rate $MFR_2$ (190° C.) determined according to ISO 1133 in the range of 10 to 70 g/10 min, e) from 1.0 to 20.0 wt.-%, based on the overall polypropylene composition (C), of the inorganic filler (F), and f) from 1.0 to 10.0 wt.-%, based on the overall polypropylene composition (C), of the foaming agent (FA) comprising citric acid in combination with a bicarbonate.

Preferably, the polypropylene composition (C) is obtained by a sequential polymerization process wherein at least two, like three, reactors are connected in series. For example, said process comprises the steps of a) polymerizing propylene and optionally ethylene in a first reactor (R1) to obtain the first propylene polymer (M1), b) transferring the first propylene polymer (M1) into a second reactor (R2), c) polymerizing in said second reactor (R2) in the presence of said first propylene polymer (M1) propylene and optionally ethylene obtaining the second propylene polymer (M2), said first propylene polymer (M1) and said second propylene polymer (M2) form the matrix (M), d) transferring the matrix (M) into a third reactor (R3), e) polymerizing in said third reactor (R3) in the presence of the matrix (M) propylene and/or a $C_4$ to $C_8$ α-olefin, obtaining a third polymer fraction, said polymer fraction is the first elastomeric copolymer (E1), f) transferring the matrix (M) and the first elastomeric copolymer (E1) into a fourth reactor (R4), g) polymerizing in said fourth reactor (R4) in the presence of the matrix (M) and the first elastomeric propylene copolymer (E1) propylene and/or a $C_4$ to $C_8$ α-olefin, obtaining a fourth polymer fraction, said polymer fraction is the second elastomeric copolymer (E2), said matrix (M) and said first elastomeric propylene copolymer (E1) and said second elastomeric propylene copolymer form a heterophasic propylene copolymer, h) optionally melt blending said heterophasic propylene copolymer obtained in the fourth reactor (R4) with the inorganic filler (F), the high density polyethylene (HDPE), the plastomer (PL), the foaming agent and optionally the nucleating agent.

Alternatively, the polypropylene composition (C) is obtained by melt blending the first heterophasic propylene copolymer (HECO1) comprising a matrix being the first propylene polymer (M1) and a dispersed phase being the first elastomeric propylene copolymer (E1), the second heterophasic propylene copolymer (HECO2) comprising a matrix being the second propylene polymer (M2) and a dispersed phase being the second elastomeric propylene copolymer (E2), the inorganic filler (F), the high density polyethylene (HDPE), the plastomer (PL), the foaming agent and optionally the nucleating agent. Melt blending of said first heterophasic propylene copolymer (HECO1) and said second heterophasic propylene copolymer (HECO2) results in a heterophasic system wherein the first propylene polymer (M1) and the second propylene polymer (M2) form the matrix and the first elastomeric propylene copolymer (E1) and the second elastomeric propylene copolymer (E2) form the dispersed phase.

It is especially preferred that the polypropylene composition (C) is obtained by melt blending said first heterophasic propylene copolymer (HECO1) and said second heterophasic propylene copolymer (HECO2) with the inorganic filler (F), the high density polyethylene (HDPE), the plastomer (PL), the foaming agent and optionally the nucleating agent.

The polypropylene composition (C) of the present invention may include additives (AD). Accordingly, it is preferred that that the polypropylene composition (C) comprises 0.05 to 5.0 wt.-%, preferably 0.1 to 3.0 wt.-% of additives (AD), based on the overall weight of the polypropylene composition (C). The additives (AD) are described in more detail below.

Preferably, the polypropylene composition (C) of the invention does not comprise (a) further polymer(s) different to the first propylene polymer (M1), the second propylene polymer (M2), the first elastomeric propylene copolymer (E1), the second elastomeric propylene copolymer (E2), the high density polyethylene (HDPE) and the plastomer (PL) in an amount exceeding 5.0 wt.-%, preferably in an amount exceeding 3.0 wt.-%, more preferably in an amount exceeding 2.5 wt.-%, based on the overall weight of the polypropylene composition (C).

It is appreciated that the polypropylene composition (C) has a moderate melt flow rate. Thus, the melt flow rate $MFR_2$ (230° C.) determined according to ISO 1133 of the polypropylene composition (C) is in the range of 15 to 40 g/10 min, preferably in the range of 18 to 38 g/10 min, more preferably in the range from 20 to 36 g/10 min and most preferably in the range from 22 to 36 g/10 min.

Further, it is preferred that the polypropylene composition (C) is featured by a rather high flexural modulus. Accordingly, it is preferred that the polypropylene composition (C) has a flexural modulus measured on injection moulded specimens according to ISO 178 of ≥1800 MPa, more preferably in the range of 1800 to 3000 MPa, still more preferably in the range of 1900 to 2800 MPa.

Further, it is preferred that the polypropylene composition (C) is featured by a low shrinkage. Accordingly, it is preferred that the polypropylene composition (C) has a shrinkage in flow direction of ≤1.2%, more preferably of ≤1.0% and most preferably of ≤0.9%.

In the following, the first heterophasic propylene copolymer (HECO1), the second heterophasic propylene copolymer (HECO2), the high density polyethylene (HDPE), the plastomer (PL), the inorganic filler (F) and the foaming agent are described in more detail.

The First Heterophasic Propylene Copolymer (HECO1)

The inventive polypropylene composition (C) comprises a first heterophasic propylene copolymer (HECO1).

The first heterophasic propylene copolymer (HECO1) according to this invention comprises a matrix (M) being the first propylene polymer (M1) and dispersed therein an elastomeric propylene copolymer (E) being the first elastomeric propylene copolymer (E1). Thus the matrix (M) contains (finely) dispersed inclusions being not part of the matrix (M) and said inclusions contain the elastomeric propylene copolymer (E). The term inclusion indicates that the matrix (M) and the inclusion form different phases within the heterophasic propylene copolymer (HECO1). The presence of second phases or the so called inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Accordingly, the first heterophasic composition (HECO1) according to this invention preferably comprises (a) the (semi)crystalline first propylene polymer (M1) as the matrix (M) and (b) the first elastomeric propylene copolymer (E1).

Preferably the weight ratio between the first propylene polymer (M1) and the elastomeric propylene copolymer (E1) [M1/E1] of the first heterophasic composition (HECO1) is in the range of 90/10 to 40/60, more preferably in the range of 85/15 to 45/55, yet more preferably in the range of 83/17 to 50/50, like in the range of 82/18 to 60/40.

Preferably, the first heterophasic propylene copolymer (HECO1) according to this invention comprises as polymer components only the first propylene polymer (M1) and the first elastomeric propylene copolymer (E1). In other words, the first heterophasic propylene copolymer (HECO1) may contain further additives but no other polymer in an amount exceeding 5.0 wt.-%, more preferably exceeding 3.0 wt.-%, like exceeding 1.0 wt.-%, based on the total first heterophasic propylene copolymer (HECO1). One additional polymer which may be present in such low amounts is a polyethylene which is a reaction by-product obtained by the preparation of the first heterophasic propylene copolymer (HECO1). Accordingly, it is in particular appreciated that the instant first heterophasic propylene copolymer (HECO1) contains only the first propylene polymer (M1), the first elastomeric propylene copolymer (E1) and optionally polyethylene in amounts as mentioned in this paragraph.

The first heterophasic propylene copolymer (HECO1) applied according to this invention is featured by a rather high melt flow rate. Accordingly, the first heterophasic propylene copolymer (HECO1) has a melt flow rate $MFR_2$ (230° C.) in the range of 50 to 200 g/10 min, preferably in the range of 60 to 160 g/10 min, more preferably in the range of 80 to 120 g/10 min.

Preferably, it is desired that the first heterophasic propylene copolymer (HECO1) is thermo mechanically stable. Accordingly, it is appreciated that the first heterophasic propylene copolymer (HECO1) has a melting temperature of at least 160° C., more preferably in the range of 160 to 167° C., still more preferably in the range of 162 to 165° C.

The first heterophasic propylene copolymer (HECO1) comprises apart from propylene also comonomers. Preferably the first heterophasic propylene copolymer (HECO1) comprises apart from propylene ethylene and/or $C_4$ to $C_8$ α-olefins. Accordingly, the term "propylene copolymer" according to this invention is understood as a polypropylene comprising, preferably consisting of, units derivable from
(a) propylene
and
(b) ethylene and/or $C_4$ to $C_8$ α-olefins.

Thus, the first heterophasic propylene copolymer (HECO1), i.e. first propylene polymer (M1) as well as the first elastomeric propylene copolymer (E1), can comprise monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the first heterophasic propylene copolymer (HECO1) according to this invention comprises, especially consists of, monomers copolymerizable with propylene from the group consisting of ethylene, 1-butene and 1-hexene. More specifically, the first heterophasic propylene copolymer (HECO1) of this invention comprises—apart from propylene—units derivable from ethylene and/or 1-butene. In a preferred embodiment, the first heterophasic propylene copolymer (HECO1) according to this invention comprises units derivable from ethylene and propylene only. Still more preferably the first propylene polymer (M1) as well as the first elastomeric propylene copolymer (E1) of the first heterophasic propylene copolymer (HECO1) contain the same comonomers, like ethylene.

Additionally, it is appreciated that the first heterophasic propylene copolymer (HECO1) preferably has a rather low total comonomer content, preferably ethylene content. Thus, it is preferred that the comonomer content of the first heterophasic propylene copolymer (HECO1) is in the range from 4.0 to 25.0 mol-%, preferably in the range from 6.0 to 18.0 mol-%, more preferably in the range from 10.0 to 14.0 mol-%.

The xylene cold soluble (XCS) fraction measured according to according ISO 16152 (25° C.) of the first heterophasic propylene copolymer (HECO1) is in the range of 15.0 to 35.0 wt.-%, preferably in the range from 17.0 to 32.0 wt.-%, more preferably in the range from 19.0 to 30.0 wt.-%, still more preferably in the range from 21.0 to 28.0 wt.-%.

Further it is appreciated that the xylene cold soluble (XCS) fraction of the first heterophasic propylene copolymer (HECO1) is specified by its intrinsic viscosity. A low intrinsic viscosity (IV) value reflects a low weight average molecular weight. For the present invention it is appreciated that the xylene cold soluble fraction (XCS) of the first heterophasic propylene copolymer (HECO1) has an intrinsic viscosity (IV) measured according to ISO 1628/1 (at 135° C. in decalin)<3.5 dl/g, preferably in the range of 1.0 to <3.5 dl/g, preferably in the range of 1.5 to 3.2 dl/g, more preferably in the range of 1.7 to 3.0 dl/g.

Additionally or alternatively, it is preferred that the comonomer content, i.e. ethylene content, of the xylene cold soluble (XCS) fraction of the first heterophasic propylene copolymer (HECO1) is from 30.0 to 40.0 wt.-%, preferably in the range of 31.0 to 38.0 wt.-%, more preferably in the range of 32.0 to 36.0 wt.-%. The comonomers present in the xylene cold soluble (XCS) fraction are those defined above for the first propylene polymer (M1) and the first elastomeric propylene copolymer (E1), respectively. In one preferred embodiment the comonomer is ethylene only.

The first heterophasic propylene copolymer (HECO1) can be further defined by its individual components, i.e. the first propylene polymer (M1) and the first elastomeric propylene copolymer (E1).

The first propylene polymer (M1) can be a propylene copolymer or a propylene homopolymer, the latter being preferred.

In case the first propylene polymer (M1) is a propylene copolymer, the first propylene polymer (M1) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the first propylene polymer (M1) according to this invention comprises, especially consists of, monomers copolymerizable with propylene from the group consisting of ethylene, 1-butene and 1-hexene. More specifically the first propylene polymer (M1) of this invention comprises—apart from propylene—units derivable from ethylene and/or 1-butene. In a preferred embodiment the first propylene polymer (M1) comprises units derivable from ethylene and propylene only.

The first propylene polymer (M1) according to this invention has a melt flow rate $MFR_2$ (230° C./2.16 kg) measured according to ISO 1133 in the range of 50 to 200 g/10 min, more preferably in the range of 70 to 180 g/10 min, still more preferably in the range of 80 to 140 g/10 min.

As mentioned above the first heterophasic propylene copolymer (HECO1) is featured by a low comonomer content. Accordingly, the comonomer content of the first propylene polymer (M1) is in the range of 0.0 to 5.0 mol-%, yet more preferably in the range of 0.0 to 3.0 mol-%, still more preferably in the range of 0.0 to 1.0 mol-%. It is especially preferred that the first propylene polymer (M1) is a propylene homopolymer.

The first heterophasic propylene copolymer (HECO1) preferably comprises 65.0 to 85.0 wt.-%, more preferably 68.0 to 83.0 wt.-%, still more preferably 70.0 to 82.0 wt.-%, most preferably from 72.0 to 81.0 wt.-%, of the first propylene polymer (M1), based on the total weight of the first heterophasic propylene copolymer (HECO1).

Additionally, the first heterophasic propylene copolymer (HECO1) preferably comprises 15.0 to 35.0 wt.-%, more preferably from 17.0 to 32.0 wt.-%, still more preferably from 18.0 to 30.0 wt.-%, most preferably from 19.0 to 28.0 wt.-%, of the first elastomeric propylene copolymer (E1), based on the total weight of the first heterophasic propylene copolymer (HECO1).

Thus, it is appreciated that the first heterophasic propylene copolymer (HECO1) preferably comprises, more preferably consists of, 65.0 to 85.0 wt.-%, more preferably 68.0 to 83.0 wt.-%, still more preferably 70.0 to 82.0 wt.-%, most preferably from 72.0 to 81.0 wt.-% of the first propylene polymer (M1) and 15.0 to 35.0 wt.-%, more preferably from 17.0 to 32.0 wt.-%, still more preferably from 18.0 to 30.0 wt.-%, most preferably from 19.0 to 28.0 wt.-% of the first elastomeric propylene copolymer (E1), based on the total weight of the first heterophasic propylene copolymer (HECO1).

Accordingly, a further component of the first heterophasic propylene copolymer (HECO1) is the elastomeric propylene copolymer (E1) dispersed in the matrix (M) being the first propylene polymer (M1). Concerning the comonomers used in the first elastomeric propylene copolymer (E1) it is referred to the information provided for the first heterophasic propylene copolymer (HECO1). Accordingly, the first elastomeric propylene copolymer (E1) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the first elastomeric propylene copolymer (E1) comprises, especially consists of, monomers copolymerizable with propylene from the group consisting of ethylene, 1-butene and 1-hexene. More specifically, the first elastomeric propylene copolymer (E1) comprises—apart from propylene—units derivable from ethylene and/or 1-butene. Thus, in an especially preferred embodiment the first elastomeric propylene copolymer (E1) comprises units derivable from ethylene and propylene only.

The comonomer content of the first elastomeric propylene copolymer (E1) preferably is in the range of 30.0 to 40.0 wt.-%, preferably in the range of 31.0 to 38.0 wt.-%, more preferably in the range of 32.0 to 36.0 wt.-%.

The first heterophasic propylene copolymer (HECO1) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

According to a preferred embodiment of the present invention, the first heterophasic propylene copolymer (HECO1) contains an α-nucleating agent.

According to this invention the alpha nucleating agent is not an additive (AD).

The alpha-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6-di-tert-butylphenyl) phosphate or aluminium-hydroxy-bis[2,2'-methylene-bis(4,6-di-t-butylphenyl)phosphate] or hydroxy-bis(2,4,8,10-tetra-tert. butyl-6-hydroxy-12H-dibenzo(d,g)(1,3,2) dioxaphosphocin 6-oxidato) aluminium, and (iv) vinylcycloalkane polymer or vinylalkane polymer, and (v) mixtures thereof.

Preferably the alpha-nucleating agent comprised in the composition of the invention is a salt of a diester of phosphoric acid, more preferably sodium 2,2'-methylenebis (4,6-di-tert-butylphenyl) phosphate or aluminium-hydroxy-bis[2,2'-methylene-bis(4,6-di-t-butylphenyl)phosphate] or hydroxy-bis(2,4,8,10-tetra-tert. butyl-6-hydroxy-12H-dibenzo(d,g)(1,3,2) dioxaphosphocin 6-oxidato) aluminium. Hydroxy-bis(2,4,8,10-tetra-tert. butyl-6-hydroxy-12H-dibenzo(d,g)(1,3,2) dioxaphosphocin 6-oxidato) aluminium is particularly preferred as α-nucleating agent. It is appreciated that the amount of the nucleating agent in the composition is not more than 500 ppm, preferably not more than 200 ppm, more preferably not more than 100 ppm, like in the range of 0.1 to 500 ppm, preferably in the range of 0.5 to 200 ppm, more preferably in the range of 1 to 100 ppm. Furthermore, it is appreciated that the nucleating agent is introduced into the composition by the BNT technology. With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

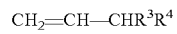

$CH_2=CH—CHR^3R^4$ wherein $R^3$ and $R^4$ together form a 5- or 6-membered saturated, unsaturated or aromatic ring or independently represent an alkyl group comprising 1 to 4 carbon atoms, and the modified catalyst is preferably used for the preparation of the heterophasic compostion (HECO) present in the modified polypropylene composition (mPP). The polymerized vinyl compound acts as an alpha-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Such nucleating agents are commercially available and are described, for example, in "Plastic Additives Handbook", 5th edition, 2001 of Hans Zweifel (pages 967 to 990).

The first heterophasic propylene copolymer (HECO1) can be produced by blending the first propylene polymer (M1) and the first elastomeric propylene copolymer (E1). However, it is preferred that the first heterophasic propylene copolymer (HECO1) is produced in a sequential step process, using reactors in serial configuration and operating at different reaction conditions. As a consequence, each fraction prepared in a specific reactor may have its own molecular weight distribution and/or comonomer content distribution.

The first heterophasic propylene copolymer (HECO1) according to this invention is preferably produced in a sequential polymerization process, i.e. in a multistage process, known in the art, wherein the first propylene polymer (M1) is produced at least in one slurry reactor, preferably in a slurry reactor and optionally in a subsequent gas phase reactor, and subsequently the first elastomeric propylene copolymer (E1) is produced at least in one, i.e. one or two, gas phase reactor(s).

Accordingly it is preferred that the first heterophasic propylene copolymer (HECO1) is produced in a sequential polymerization process comprising the steps of (a) polymerizing propylene and optionally at least one ethylene and/or $C_4$ to $C_{12}$ α-olefin in a first reactor (R1) obtaining the first polypropylene fraction of the first propylene polymer (M1), preferably said first polypropylene fraction is a propylene homopolymer, (b) transferring the first polypropylene fraction into a second reactor (R2), (c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the first propylene polymer (M1), i.e. the matrix of the first heterophasic propylene copolymer (HECO1), (d) transferring the first propylene polymer (M1) of step (c) into a third reactor (R3), (e) polymerizing in the third reactor (R3) and in the presence of the first propylene polymer (M1) obtained in step (c) propylene and ethylene to obtain the first elastomeric propylene copolymer (E1) dispersed in the first propylene polymer (M1), the first propylene polymer (M1) and the first elastomeric propylene copolymer (E1) form the first heterophasic propylene copolymer (HECO1).

Of course, in the first reactor (R1) the second polypropylene fraction can be produced and in the second reactor (R2) the first polypropylene fraction can be obtained. The same holds true for the elastomeric propylene copolymer phase.

Preferably between the second reactor (R2) and the third reactor (R3) the monomers are flashed out.

The term "sequential polymerization process" indicates that the first heterophasic propylene copolymer (HECO1) is produced in at least two, like three or four reactors connected in series. Accordingly, the present process comprises at least a first reactor (R1) and a second reactor (R2), more preferably a first reactor (R1), a second reactor (R2), and a third reactor (R3). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) is preferably a gas phase reactor (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) is a gas phase reactors (GPR). Accordingly for the instant process at least three, preferably three polymerization reactors, namely two slurry reactors (SR), like two loop reactors (LR), and a gas phase reactor (GPR-1) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the first heterophasic propylene copolymer (HECO1) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3), preferably in the second gas phase reactor (GPR-2) is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic composition (HECO1) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic composition (HECO1) is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

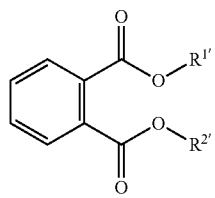

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of
adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_5$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

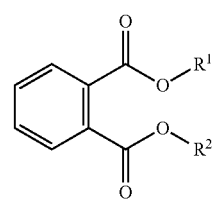

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic composition (HECO1) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by

$$Si(OCH_3)_2R^5_2 \quad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

$$Si(OCH_2CH_3)_3(NR^xR^y) \quad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [Si(OCH₃)₂(cyclo-pentyl)₂], diisopropyl dimethoxy silane [Si(OCH₃)₂(CH(CH₃)₂)₂].

Most preferably the external donor is dicyclopentyl dimethoxy silane [Si(OCH₃)₂(cyclo-pentyl)₂].

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

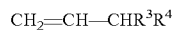

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic composition (HECO) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Second Heterophasic Propylene Copolymer (HECO2)

The inventive polypropylene composition (C) further comprises a second heterophasic propylene copolymer (HECO2).

The second heterophasic propylene copolymer (HECO2) according to this invention comprises a matrix (M) being the second propylene polymer (M2) and dispersed therein an elastomeric propylene copolymer (E) being the second elastomeric propylene copolymer (E2). Thus the matrix (M) contains (finely) dispersed inclusions being not part of the matrix (M) and said inclusions contain the elastomeric propylene copolymer (E). Regarding the term inclusion, reference is made to the definition provided above.

Accordingly, the second heterophasic composition (HECO2) according to this invention preferably comprises
(a) the (semi)crystalline second propylene polymer (M2) as the matrix (M) and
(b) the second elastomeric propylene copolymer (E2).

Preferably the weight ratio between the second propylene polymer (M2) and the elastomeric propylene copolymer (E2) [M2/E2] of the second heterophasic propylene copolymer (HECO2) is in the range of 90/10 to 40/60, more preferably in the range of 85/15 to 45/55, yet more preferably in the range of 83/17 to 50/50, like in the range of 75/25 to 60/40.

Preferably, the second heterophasic propylene copolymer (HECO2) according to this invention comprises as polymer components only the second propylene polymer (M2) and the first elastomeric propylene copolymer (E2). In other words, the second heterophasic propylene copolymer (HECO2) may contain further additives but no other polymer in an amount exceeding 5.0 wt.-%, more preferably exceeding 3.0 wt.-%, like exceeding 1.0 wt.-%, based on the total second heterophasic propylene copolymer (HECO2). One additional polymer which may be present in such low amounts is a polyethylene which is a reaction by-product obtained by the preparation of the second heterophasic propylene copolymer (HECO2). Accordingly, it is in particular appreciated that the instant second heterophasic propylene copolymer (HECO2) contains only the second propylene polymer (M2), the second elastomeric propylene copolymer (E2) and optionally polyethylene in amounts as mentioned in this paragraph.

The second heterophasic propylene copolymer (HECO2) applied according to this invention is featured by a rather low melt flow rate. Accordingly, the second heterophasic propylene copolymer (HECO2) has a melt flow rate $MFR_2$ (230° C.) in the range of 3 to <50 g/10 min, preferably in the range of 5 to 40 g/10 min, more preferably in the range of 12.0 to 32 g/10 min.

Preferably, it is desired that the second heterophasic propylene copolymer (HECO2) is thermo mechanically stable. Accordingly, it is appreciated that the second heterophasic propylene copolymer (HECO2) has a melting temperature of at least 162° C., more preferably in the range of 163 to 167° C., still more preferably in the range of 163 to 165° C.

The second heterophasic propylene copolymer (HECO2) comprises apart from propylene also comonomers. Preferably the second heterophasic propylene copolymer (HECO2) comprises apart from propylene ethylene and/or $C_4$ to $C_8$ α-olefins. Regarding term "propylene copolymer", reference is made to the definition provided above.

Thus, the second heterophasic propylene copolymer (HECO2), i.e. second propylene polymer (M2) as well as the second elastomeric propylene copolymer (E2), can comprise monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the second heterophasic propylene copolymer (HECO2) according to this invention comprises, especially consists of, monomers copolymerizable with propylene from the group consisting of ethylene, 1-butene and 1-hexene. More specifically, the second heterophasic propylene copolymer (HECO2) of this invention comprises—apart from propylene—units derivable from ethylene and/or 1-butene. In a preferred embodiment, the second heterophasic propylene copolymer (HECO2) according to this invention comprises units derivable from ethylene and propylene only. Still more preferably the second propylene polymer (M1) as well as the second elastomeric propylene copolymer (E2) of the second heterophasic propylene copolymer (HECO2) contain the same comonomers, like ethylene.

Additionally, it is appreciated that the second heterophasic propylene copolymer (HECO2) preferably has a rather low total comonomer content, preferably ethylene content. Thus, it is preferred that the comonomer content of the second heterophasic propylene copolymer (HECO2) is in the range from 5.0 to 30.0 mol-%, preferably in the range from 6.0 to 18.0 mol-%, more preferably in the range from 7.0 to 15.0 mol-%.

The xylene cold soluble (XCS) fraction measured according to according ISO 16152 (25° C.) of the second heterophasic propylene copolymer (HECO2) is in the range of 10.0 to 35.0 wt.-%, preferably in the range from 17.0 to 35.0 wt.-%, more preferably in the range from 20.0 to 34.0 wt.-%, still more preferably in the range from 23.0 to 32.0 wt.-%.

Further it is appreciated that the xylene cold soluble (XCS) fraction of the second heterophasic propylene copolymer (HECO2) is specified by its intrinsic viscosity. A low intrinsic viscosity (IV) value reflects a low weight average molecular weight. For the present invention it is appreciated that the xylene cold soluble fraction (XCS) of the second heterophasic propylene copolymer (HECO2) has an intrinsic viscosity (IV) measured according to ISO 1628/1 (at 135° C. in decalin)<4.0 dl/g. More preferably, the second heterophasic propylene copolymer (HECO2) has an intrinsic viscosity (IV) in the range of 1.0 to <4.0 dl/g, preferably in the range of 1.4 to 3.8 dl/g, more preferably in the range of 1.8 to 3.6 dl/g.

Additionally or alternatively, it is preferred that the comonomer content, i.e. ethylene content, of the xylene cold soluble (XCS) fraction of the second heterophasic propylene copolymer (HECO2) is from 35 to 50 wt.-%, preferably in the range of 38 to 48 wt-%, more preferably in the range of 39 to 46 wt.-%, yet more preferably in the range of 40 to 44 wt.-%. The comonomers present in the xylene cold soluble (XCS) fraction are those defined above for the second propylene polymer (M2) and the second elastomeric propylene copolymer (E2), respectively. In one preferred embodiment the comonomer is ethylene only.

The second heterophasic propylene copolymer (HECO2) can be further defined by its individual components, i.e. the second propylene polymer (M2) and the second elastomeric propylene copolymer (E2).

The second propylene polymer (M2) can be a propylene copolymer or a propylene homopolymer, the latter being preferred.

In case the second propylene polymer (M2) is a propylene copolymer, the second propylene polymer (M2) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the second propylene polymer (M2) according to this invention comprises, especially consists of, monomers copolymerizable with propylene from the group consisting of ethylene, 1-butene and 1-hexene. More specifically the second propylene polymer (M2) of this invention comprises—apart from propylene—units derivable from ethylene and/or 1-butene. In a preferred embodiment the second propylene polymer (M2) comprises units derivable from ethylene and propylene only.

The second propylene polymer (M2) according to this invention has a melt flow rate $MFR_2$ (230° C./2.16 kg) measured according to ISO 1133 in the range of 50 to 200 g/10 min, more preferably in the range of 75 to 180 g/10 min, still more preferably in the range of 80 to 150 g/10 min.

The comonomer content of the second propylene polymer (M2) is in the range of 0.0 to 5.0 mol-%, yet more preferably in the range of 0.0 to 3.0 mol-%, still more preferably in the range of 0.0 to 1.0 mol-%. It is especially preferred that the second propylene polymer (M2) is a propylene homopolymer.

The second propylene polymer (M2) preferably comprises at least two polymer fractions, like two or three polymer fractions, all of them are propylene homopolymers. Even more preferred the second propylene polymer (M2) comprises, preferably consists of, a first propylene homopolymer fraction (H-PP1) and a second propylene homopolymer fraction (H-PP2).

The second heterophasic propylene copolymer (HECO2) preferably comprises from 65.0 to 90.0 wt.-%, more preferably from 65.0 to 83.0 wt.-%, even more preferably from 66.0 to 80.0 wt.-% and most preferably from 68.0 to 77.0 wt.-% of the second propylene polymer (M2), based on the total weight of the second heterophasic propylene copolymer (HECO2).

Additionally, the second heterophasic propylene copolymer (HECO2) preferably comprises from 10.0 to 35.0 wt.-%, more preferably from 17.0 to 35.0 wt.-%, even more preferably from 20.0 to 34.0 wt.-%, and most preferably from 23.0 to 32.0 wt.-% of the second elastomeric propylene copolymer (E2), based on the total weight of the second heterophasic propylene copolymer (HECO2).

Thus, it is appreciated that the second heterophasic propylene copolymer (HECO2) preferably comprises, more preferably consists of, comprises from 65.0 to 90.0 wt.-%, more preferably from 65.0 to 83.0 wt.-%, even more preferably from 66.0 to 80.0 wt.-% and most preferably from 68.0 to 77.0 wt.-% of the second propylene polymer (M2) and from 10.0 to 35.0 wt.-%, more preferably from 17.0 to 35.0 wt.-%, even more preferably from 20.0 to 34.0 wt.-%, and most preferably from 23.0 to 32.0 wt.-% of the second elastomeric propylene copolymer (E2), based on the total weight of the second heterophasic propylene copolymer (HECO2).

Accordingly, a further component of the second heterophasic propylene copolymer (HECO2) is the second elastomeric propylene copolymer (E2) dispersed in the matrix (M) being the second propylene polymer (M2). Concerning the comonomers used in the second elastomeric propylene copolymer (E2) it is referred to the information provided for the first heterophasic propylene copolymer (HECO1). Accordingly, the second elastomeric propylene copolymer (E2) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the second elastomeric propylene copolymer (E2) comprises, especially consists of, monomers copolymerizable with propylene from the group consisting of ethylene, 1-butene and 1-hexene. More specifically, the second elastomeric propylene copolymer (E2) comprises—apart from propylene—units derivable from ethylene and/or 1-butene. Thus, in an especially preferred embodiment the second elastomeric propylene copolymer (E2) comprises units derivable from ethylene and propylene only.

The comonomer content of the second elastomeric propylene copolymer (E2) preferably is in the range of 35.0 to 50.0 wt.-%, preferably in the range of 38.0 to 48.0 wt.-%, more preferably in the range of 39.0 to 46.0 wt.-%, yet more preferably in the range of 40.0 to 44.0 wt.-%.

The second heterophasic propylene copolymer (HECO2) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

According to a preferred embodiment of the present invention, the second heterophasic propylene copolymer (HECO2) contains an α-nucleating agent.

Regarding the preferred α-nucleating agents, reference is made to the α-nucleating agents described above with regard to the first heterophasic propylene copolymer (HECO1).

The second heterophasic propylene copolymer (HECO2) can be produced by blending the second propylene polymer (M2) and the second elastomeric propylene copolymer (E2). However, it is preferred that the second heterophasic propylene copolymer (HECO2) is produced in a sequential step process, using reactors in serial configuration and operating at different reaction conditions. As a consequence, each fraction prepared in a specific reactor may have its own molecular weight distribution and/or comonomer content distribution.

Accordingly, it is preferred that the second heterophasic propylene copolymer (HECO2) is produced in a sequential polymerization process comprising the steps of (a) polymerizing propylene and optionally at least one ethylene and/or $C_4$ to $C_{12}$ α-olefin in a first reactor (R1) obtaining the first polypropylene fraction of the first propylene polymer (M1), preferably said first polypropylene fraction is a propylene homopolymer, (b) transferring the first polypropylene fraction into a second reactor (R2), (c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the second propylene polymer (M2), i.e. the matrix of the second heterophasic propylene copolymer (HECO2), (d) transferring the second propylene polymer (M2) of step (c) into a third reactor (R3), (e) polymerizing in the third reactor (R3) and in the presence of the second propylene polymer (M2) obtained in step (c) propylene and ethylene to obtain the first propylene copolymer fraction of the second elastomeric propylene copolymer (E2) dispersed in the second propylene polymer (M2), (f) transferring the second propylene polymer (M2) and the first propylene copolymer fraction of the second elastomeric propylene copolymer (E2) into a fourth reactor (R4), (g) polymerizing in the fourth reactor (R4) and in the presence of the second propylene polymer (M2) and the first propylene copolymer fraction of the second elastomeric propylene copolymer (E2) propylene and ethylene to obtain the second propylene copolymer fraction of the second elastomeric propylene copolymer (E2) dispersed in the second propylene polymer (M2), the second propylene polymer (M2) and the second elastomeric propylene copolymer (E) form the second propylene copolymer (HECO2).

Of course, in the first reactor (R1) the second polypropylene fraction can be produced and in the second reactor (R2) the first polypropylene fraction can be obtained. The same holds true for the elastomeric propylene copolymer phase.

Preferably between the second reactor (R2) and the third reactor (R3) the monomers are flashed out.

The term "sequential polymerization process" indicates that the second heterophasic propylene copolymer (HECO2) is produced in at least two, like three or four reactors connected in series. Accordingly, the present process comprises at least a first reactor (R1) and a second reactor (R2), more preferably a first reactor (R1), a second reactor (R2), a third reactor (R3) and a fourth reactor (R4). Regarding the term "polymerization reactor", reference is made to the definition provided above.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and the fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase ractor (GPR-3) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) and the fourth reactor (R4) are gas phase reactors (GPR). Accordingly for the instant process at least four, preferably four polymerization reactors, namely two slurry reactors (SR), like two loop reactors (LR), and two gas phase reactors (GPR-1) and (GPR-2) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the second heterophasic propylene copolymer (HECO2) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably, the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the second heterophasic propylene copolymer (HECO2) is obtained by a multistage polymerization process, as described above, in the presence of a catalyst system comprising as component (i) a Ziegler-Natta procatalyst which contains a trans-esterification product of a lower alcohol and a phthalic ester.

Regarding the preferred catalyst system, reference is made to the catalyst defined above with regard to the first heterophasic propylene copolymer (HECO1).

In a further embodiment, the Ziegler-Natta procatalyst for the production of the second heterophasic propylene copolymer (HECO2) can also be modified by polymerizing a vinyl compound in the presence of the catalyst system as described above.

The High Density Polyethylene (HDPE)

The polypropylene composition (C) further comprises a high density polyethylene (HDPE). The high density polyethylene (HDPE) is especially advantageous for improving the scratch resistance.

The expression "high density polyethylene" used in the instant invention relates to a polyethylene obtained in the presence of a Ziegler-Natta or metallocene catalyst that consists substantially, i.e. of more than 99.70 mol-%, still more preferably of at least 99.80 mol-%, of ethylene units. In a preferred embodiment only ethylene units in the high density polyethylene (HDPE) are detectable.

The high density polyethylene (HDPE) has a density of at least 0.800 g/cm$^3$. More preferably, the high density polyethylene (HDPE) has a density in the range of 0.830 to 0.970 g/cm$^3$, still more preferably in the range of 0.900 to 0.965 g/cm$^3$, like in the range of 0.940 to 0.960 g/cm$^3$.

It is especially preferred that the high density polyethylene (HDPE) has a weight average molecular weight Mw in the range of 60 to 100 kg/mol, preferably in the range of 65 to 95 kg/mol, still more preferably in the range of 70 to 90 kg/mol.

Furthermore, it is preferred that the high density polyethylene (HDPE) has a rather broad molecular weight distribution (Mw/Mn). Accordingly, it is preferred that the molecular weight distribution (Mw/Mn) of the high density polyethylene (HDPE) is in the range of 7.0 to 10.0, more preferably in the range of 7.5 to 10.0, like in the range of 8.0 to 10.0.

Additionally, it is required that the high density polyethylene (HDPE) has a rather low melt flow rate. Accordingly, the melt flow rate (190° C.) measured according to ISO 1133 of the high density polyethylene (HDPE) is in the range from 2 to 15 g/10 min, more preferably in the range of 2 to 12 g/10 min, still more preferably in the range of 2 to 9 g/10 min at 190° C.

Preferably, the high density polyethylene (HDPE) according to the present invention is a high density polyethylene known in the art. In particular, it is preferred that the high density polyethylene (HDPE) is the commercial ethylene homopolymer BorPure™ MB7541 of Borealis AG.

The Plastomer (PL)

It is further required that the polypropylene composition (C) further comprises a plastomer (PL) being a copolymer of ethylene and a $C_4$ to $C_8$ α-olefin.

The plastomer (PL) can be any elastomeric polyolefin with the proviso that it chemically differs from the elastomeric propylene copolymers (E1) and (E2) as defined herein. More preferably the plastomer (PL) is a very low density polyolefin, still more preferably a very low density polyolefin polymerized using single site catalysis, preferably metallocene catalysis. Typically, the plastomer (PL) is an ethylene copolymer.

The plastomer (PL) has a density below 0.900 $g/cm^3$. More preferably, the density of the plastomer (PL) is equal or below 0.890 $g/cm^3$, still more preferably in the range of 0.845 to 0.890 $g/cm^3$.

Preferably, the plastomer (PL) has a melt flow rate $MFR_2$ (190° C., 2.16 kg) from 10 to 70 g/10 min, still more preferably from 15 to 50 g/10 min, like a range from 25 to 40 g/10 min.

Preferably, the plastomer (PL) comprises units derived from ethylene and a $C_4$ to $C_{20}$ α-olefin.

The plastomer (PL) comprises, preferably consists of, units derivable from (i) ethylene and (ii) at least another C4 to C20 α-olefin, like C4 to C10 α-olefin, more preferably units derivable from (i) ethylene and (ii) at least another α-olefin selected form the group consisting of 1-butene, 1-pentene, 1-hexene, 1-heptene and 1-octene. It is especially preferred that the plastomer (PL) comprises at least units derivable from (i) ethylene and (ii) 1-butene or 1-octene. It is especially preferred that the plastomer (PL) is a copolymer of ethylene and 1-octene.

In an especially preferred embodiment, the plastomer (PL) consists of units derivable from ethylene and 1-octene.

The comonomer content, like the C4 to C20 α-olefin content, of the plastomer (PL) is in the range of 3.0 to 25.0 mol-%, more preferably in the range of 4.0 to 20.0 mol-%, still more preferably in the range of 5.0 to 15.0 mol-%, like in the range of 6.0 to 10.0 mol-%.

In one preferred embodiment the plastomer (PL) is prepared with at least one metallocene catalyst. The plastomer (PL) may also be prepared with more than one metallocene catalyst or may be a blend of multiple elastomers prepared with different metallocene catalysts. In some embodiments, the plastomer (PL) is a substantially linear ethylene polymer (SLEP). SLEPs and other metallocene catalysed plastomers (PL) are known in the art, for example, U.S. Pat. No. 5,272,236. These resins are also commercially available, for example, as Queo™ plastomers available from Borealis, ENGAGE™ plastomer resins available from Dow Chemical Co. or EXACT™ polymers from Exxon or TAFMER™ polymers from Mitsui.

The Inorganic Filler (F)

A further requirement of the composition according to this invention is the presence of an inorganic filler (F).

Preferably the inorganic filler (F) is a mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc.

The most preferred inorganic fillers (F) are talc and/or wollastonite.

It is appreciated that the filler (F) has a median particle size ($D_{50}$) in the range of 0.8 to 20 m and a top cut particle size ($D_{95}$) in the range of 10 to 20 μm, preferably a median particle size ($D_{50}$) in the range of 5.0 to 8.0 μm and a top cut particle size ($D_{95}$) in the range of 12 to 17 μm, more preferably a median particle size ($D_{50}$) in the range of 5.5 to 7.8 μm and a top cut particle size ($D_{95}$) of 13 to 16.5 μm.

According to this invention the filler (F) does not belong to the class of alpha nucleating agents and additives (AD).

The the filler (F) is state of the art and a commercially available product.

Foaming Agent

It is specifically required that the composition according to this invention comprises a foaming agent.

The foaming agent (FA) comprises citric acid in combination with a bicarbonate. Preferably, the bicarbonate is a salt of a bicarbonate such as an alkali or earth alkali bicarbonate.

For example, the bicarbonate is selected from the group comprising sodium bicarbonate, potassium bicarbonate, magnesium bicarbonate, calcium bicarbonate, ammonium bicarbonate and mixtures thereof. Most preferably, the bicarbonate is sodium bicarbonate.

That is to say, the foaming agent comprises, preferably consists of, citric acid in combination with a bicarbonate selected from the group comprising sodium bicarbonate, potassium bicarbonate, magnesium bicarbonate, calcium bicarbonate, ammonium bicarbonate and mixtures thereof.

In one embodiment, the foaming agent comprises, preferably consists of, citric acid and sodium bicarbonate.

The weight ratio of the citric acid and the bicarbonate [citric acid/bicarbonate] is preferably from 3:1 to 1:100. More preferably, the weight ratio of the citric acid and the bicarbonate [citric acid/bicarbonate] is from 2:1 to 1:100. Most preferably, the weight ratio of the citric acid and the bicarbonate [citric acid/bicarbonate] is about equal, i.e. about 1:1 to 1:100, e.g. from 1:50 to 1:100.

In one embodiment, the foaming agent (FA) comprises citric acid in an amount of ≤20.0 wt.-%, preferably from 0.1 to 20.0 wt.-%, more preferably from 0.5 to 15.0 wt.-% and most preferably from 1.0 to 10.0 wt.-%, based on the total weight of the foaming agent.

Additionally or alternatively, the foaming agent (FA) comprises the bicarbonate in an amount of ≥80.0 wt.-%, preferably from 80.0 to 99.9 wt.-%, more preferably from 85.0 to 99.5 wt.-% and most preferably from 90.0 to 99.0 wt.-%, based on the total weight of the foaming agent.

For example, the foaming agent (FA) comprises, preferably consists of, citric acid in an amount of ≤20.0 wt.-%, preferably from 0.1 to 20.0 wt.-%, more preferably from 0.5 to 15.0 wt.-% and most preferably from 1.0 to 10.0 wt.-%, based on the total weight of the foaming agent, and the bicarbonate in an amount of ≥80.0 wt.-%, preferably from 80.0 to 99.9 wt.-%, more preferably from 85.0 to 99.5 wt.-% and most preferably from 90.0 to 99.0 wt.-%, based on the total weight of the foaming agent.

Such foaming agents are commercially available, for example, as EE25C from EIWA CHEMICAL IND. CO., LTD.

Additives (AD)

In addition to the first heterophasic propylene copolymer (HECO1), the second heterophasic propylene copolymer (HECO2), the inorganic filler (F), the plastomer (PL), the high density polyethylene (HDPE) and the foaming agent, the composition (C) of the invention may include additives (AD). Typical additives are acid scavengers, antioxidants, colorants, light stabilisers, plasticizers, slip agents, anti-scratch agents, dispersing agents, processing aids, lubricants, pigments, and the like. As indicated above the inorganic filler (F) is not regarded as an additive (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the composition (C) of the invention does not comprise (a) further polymer (s) different to the first and second heterophasic propylene copolymers (HECO1) and (HECO2), the plastomer (PL) and the high density polyethylene (HDPE), in an amount exceeding 15 wt.-%, preferably in an amount exceeding 10 wt.-%, more preferably in an amount exceeding 9 wt.-%, based on the weight of the composition (C). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The composition of the present invention is preferably used for the production of articles, more preferably of foamed articles. Even more preferred is the use for the production of automotive articles, especially of car interiors and exteriors, like bumpers, side trims, step assists, body panels, spoilers, dashboards, interior trims and the like.

The current invention also provides articles, more preferably foamed articles, comprising, preferably comprising at least 60 wt.-%, more preferably at least 80 wt.-%, yet more preferably at least 95 wt.-%, like consisting of, the inventive composition. Accordingly, the present invention is especially directed to parts of automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive composition.

The Use

The present invention is also directed to the use of the inventive composition for the production of a foamed article as described in the previous paragraphs.

The present invention will now be described in further detail by the examples provided below.

EXAMPLES

1. Measuring Methods

The following definitions of terms and determination methods apply for the above general description of the invention as well as to the below examples unless otherwise defined.

Calculation of comonomer content of the elastomeric copolymer fraction, i.e. the polymer fraction produced in the third reactor (R3), of the first heterophasic propylene copolymer (HECO1):

$$\frac{C(PP) - w(PP12) \times C(PP12)}{w(PP3)} = C(PP3) \qquad (I)$$

wherein w(PP12) is the weight fraction [in wt.-%] of the first and second propylene polymer fraction, i.e. the polymer produced in the first and second reactor (R1+R2), w(PP3) is the weight fraction [in wt.-%] of the elastomeric propylene copolymer fraction, i.e. the polymer produced in the third reactor (R3), C(PP12) is the comonomer content [in mol-%] of the first and second propylene polymer fraction, i.e. the polymer produced in the first and second reactor (R1+R2), C(PP) is the comonomer content [in mol-%] of the first propylene polymer fraction, the second propylene polymer fraction and the elastomeric propylene copolymer fraction, i.e. polymer produced in the first, second and third reactor (R1+R2+R3), C(PP3) is the calculated comonomer content [in mol-%] of the elastomeric propylene copolymer fraction, i.e. the polymer produced in the third reactor (R3).

Calculation of the xylene cold soluble (XCS) content of the elastomeric propylene copolymer fraction, i.e. the polymer fraction produced in the third reactor (R3), of the first heterophasic propylene copolymer (HECO1):

$$\frac{XS(HECO) - w(PP12) \times XS(PP12)}{w(E)} = XS(E) \qquad (II)$$

wherein w(PP12) is the weight fraction [in wt.-%] of the first and second propylene polymer fraction, i.e. the polymer produced in the first and second reactor (R1+R2), w(E) is the weight fraction [in wt.-%] of the elastomeric propylene copolymer fraction, i.e. the polymer produced in the third reactor (R3)

XS(PP12) is the xylene cold soluble (XCS) content [in wt.-%] of the first and second propylene polymer fraction, i.e. the polymer produced in the first and second reactor (R1+R2), XS(HECO) is the xylene cold soluble (XCS) content [in wt.-%] of the first propylene polymer fraction, the second propylene polymer fraction and the elastomeric propylene copolymer fraction, i.e. polymer produced in the first, second reactor and third reactor (R1+R2+R3), XS(E) is the calculated xylene cold soluble (XCS) content [in wt.-%] of the elastomeric propylene copolymer fraction, i.e. the polymer produced in the second and third reactor (R2+3).

Calculation of melt flow rate MFR$_2$ (230° C.) of the elastomeric propylene copolymer fraction, i.e. the polymer fraction produced in the third reactor (R3), of the first heterophasic propylene copolymer (HECO1):

$$MFR(PP3) = 10\left[\frac{\log(MFR(PP)) - w(PP12) \times \log(MFR(PP12))}{w(PP3)}\right] \quad \text{(III)}$$

wherein w(PP12) is the weight fraction [in wt.-%] of the first and second propylene polymer fractions, i.e. the polymer produced in the first and second reactor (R1+R2), w(PP3) is the weight fraction [in wt.-%] of the elastomeric propylene copolymer fraction, i.e. the polymer produced in the third reactor (R3), MFR(PP12) is the melt flow rate MFR$_2$ (230° C.) [in g/10 min] of the first and second propylene fractions, i.e. the polymer produced in the first and second reactor (R1+R2), MFR(PP) is the melt flow rate MFR$_2$ (230° C.) [in g/10 min] of the first and second propylene polymer fractions and the elastomeric propylene copolymer fraction, i.e. the polymer produced in the first, second and third reactor (R1+R2+R3), MFR(PP3) is the calculated melt flow rate MFR$_2$ (230° C.) [in g/10 min] of the elastomeric propylene copolymer fraction, i.e. the polymer produced in the third reactor (R3).

Calculation of comonomer content of the elastomeric propylene copolymer fraction, i.e. the polymer fraction produced in the third reactor (R3), of the first heterophasic propylene copolymer (HECO1):

$$\frac{C(HECO) - w(PP) \times C(PP)}{w(E)} = C(E) \quad \text{(IV)}$$

wherein w(PP) is the weight fraction [in wt.-%] of the first and second propylene polymer fractions, i.e. the polymer produced in the first and second reactor (R1+R2), w(E) is the weight fraction [in wt.-%] of the elastomeric propylene copolymer, i.e. of the polymer produced in the third reactor (R3), C(PP) is the comonomer content [in mol-%] of the first and second propylene polymer fractions, i.e. the polymer produced in the first and second reactor (R1+R2), C(HECO) is the comonomer content [in mol-%] of the propylene copolymer, i.e. is the comonomer content [in mol-%] of the polymer obtained after polymerization in the third reactor (R3), C(E) is the calculated comonomer content [in mol-%] of the elastomeric propylene copolymer fraction, i.e. of the polymer produced in the third reactor (R3).

Calculation of comonomer content of the first elastomeric propylene copolymer fraction, i.e. the polymer fraction produced in the third reactor (R3), of the second heterophasic propylene copolymer (HECO2):

$$\frac{C(PP) - w(PP12) \times C(PP12)}{w(PP3)} = C(PP3) \quad \text{(V)}$$

wherein w(PP12) is the weight fraction [in wt.-%] of the first and second propylene polymer fractions, i.e. the polymer produced in the first and second reactor (R1+R2), w(PP3) is the weight fraction [in wt.-%] of the first elastomeric propylene copolymer fraction, i.e. the polymer produced in the third reactor (R3), C(PP12) is the comonomer content [in mol-%] of the first and second propylene polymer fractions, i.e. the polymer produced in the first and second reactor (R1+R2), C(PP) is the comonomer content [in mol-%] of the first and second propylene polymer fractions and the first elastomeric propylene copolymer fraction, i.e. the polymer produced in the first, second and third reactor (R1+R2+R3), C(PP2) is the calculated comonomer content [in mol-%] of the first elastomeric propylene copolymer fraction, i.e. the polymer produced in the third reactor (R3).

Calculation of comonomer content of the second elastomeric propylene copolymer fraction, i.e. the polymer fraction produced in the fourth reactor (R3), of the second heterophasic propylene copolymer (HECO2):

$$\frac{C(PP) - w(PP123) \times C(PP123)}{w(PP4)} = C(PP4) \quad \text{(VI)}$$

wherein w(PP123) is the weight fraction [in wt.-%] of the first and second propylene polymer fractions and the first elastomeric propylene copolymer fraction, i.e. the polymer produced in the first, second and third reactor (R1+R2+R3), w(PP4) is the weight fraction [in wt.-%] of second elastomeric propylene copolymer fraction, i.e. the polymer produced in the fourth reactor (R4), C(PP123) is the comonomer content [in mol-%] of the first and second propylene polymer fractions and the first elastomeric propylene copolymer fraction, i.e. the polymer produced in the first, second and third reactor (R1+R2+R3), C(PP) is the comonomer content [in mol-%] of the first and second propylene polymer fractions and the first and second elastomeric propylene copolymer fractions, i.e. the polymer produced in the first, second, third and fourth reactor (R1+R2+R3+4), C(PP4) is the calculated comonomer content [in mol-%] of the second elastomeric propylene copolymer fraction, i.e. the polymer produced in the fourth reactor (R4).

Calculation of the xylene cold soluble (XCS) content of the elastomeric propylene copolymer fraction, i.e. the polymer fraction produced in the third and fourth reactor (R3+R4), of the second heterophasic propylene copolymer (HECO2):

$$\frac{XS(HECO) - w(PP12) \times XS(PP12)}{w(E)} = XS(E) \quad \text{(VII)}$$

wherein w(PP12) is the weight fraction [in wt.-%] of the first and second propylene polymer fractions, i.e. the polymer produced in the first and second reactor (R1+R2), w(E) is the weight fraction [in wt.-%] of the elastomeric propylene copolymer fraction, i.e. the polymer produced in the third and fourth reactor (R3+R4)

XS(PP12) is the xylene cold soluble (XCS) content [in wt.-%] of the first and second propylene polymer fractions, i.e. the polymer produced in the first and second reactor (R1+R2), XS(HECO) is the xylene cold soluble (XCS) content [in wt.-%] of the first and second propylene polymer fractions and the elastomeric propylene copolymer fraction, i.e. polymer produced in the first, second, third and fourth (R1+R2+R3+R4), XS(E) is the calculated xylene cold soluble (XCS) content [in wt.-%] of the elastomeric propylene copolymer fraction, i.e. the polymer produced in the third and fourth reactor (R3+R4).

Calculation of the xylene cold soluble (XCS) content of the first elastomeric propylene copolymer fraction, i.e. the polymer fraction produced in the third reactor (R3), of the second heterophasic propylene copolymer (HECO2):

$$\frac{XS(PP) - w(PP12) \times XS(PP12)}{w(PP3)} = XS(PP3) \quad \text{(VIII)}$$

wherein w(PP12) is the weight fraction [in wt.-%] of the first and second propylene polymer fractions, i.e. the polymer produced in the first and second reactor (R1+R2), w(PP3) is the weight fraction [in wt.-%] of the first elastomeric propylene copolymer fraction, i.e. the polymer produced in the third reactor (R3)

XS(PP12) is the xylene cold soluble (XCS) content [in wt.-%] of the first and second elastomeric propylene polymer fractions, i.e. the polymer produced in the first and second reactor (R1+R2), XS(PP) is the xylene cold soluble (XCS) content [in wt.-%] of the first and second propylene polymer fraction and the first elastomeric propylene copolymer fraction, i.e. polymer produced in the first, second and third reactor (R1+R2+R3), XS(PP3) is the calculated xylene cold soluble (XCS) content [in wt.-%] of the first elastomeric propylene copolymer fraction, i.e. the polymer produced in the third reactor (R3).

Calculation of the xylene cold soluble (XCS) content of the second elastomeric propylene copolymer fraction, i.e. the polymer fraction produced in the fourth reactor (R4):

$$\frac{XS(PP) - w(PP123) \times XS(PP123)}{w(PP4)} = XS(PP4) \quad \text{(IX)}$$

wherein w(PP123) is the weight fraction [in wt.-%] of the first and second propylene polymer fractions and the first elastomeric propylene copolymer fraction, i.e. the polymer produced in the first, second and third reactor (R1+R2+R3), w(PP4) is the weight fraction [in wt.-%] of the second propylene copolymer fraction, i.e. the polymer produced in the fourth reactor (R4)

XS(PP123) is the xylene cold soluble (XCS) content [in wt.-%] of the first and second propylene polymer fractions and the first elastomeric propylene copolymer fraction, i.e. the polymer produced in the first, second and third reactor (R1+R2+R3), XS(PP) is the xylene cold soluble (XCS) content [in wt.-%] of the first and second propylene polymer fractions and the first and second elastomeric propylene copolymer fractions, i.e. polymer produced in the first, second, third and fourth reactor (R1+R2+R3+R4), XS(PP4) is the calculated xylene cold soluble (XCS) content [in wt.-%] of the second elastomeric propylene copolymer fraction, i.e. the polymer produced in the fourth reactor (R4).

Calculation of melt flow rate $MFR_2$ (230° C.) of the second propylene polymer fraction, i.e. the polymer fraction produced in the second reactor (R2), of the second heterophasic propylene copolymer (HECO2):

$$MFR(PP2) = 10^{\left[\frac{\log(MFR(PP)) - w(PP1) \times \log(MFR(PP1))}{w(PP2)}\right]} \quad \text{(X)}$$

wherein w(PP1) is the weight fraction [in wt.-%] of the first propylene polymer fraction, i.e. the polymer produced in the first reactor (R1), w(PP2) is the weight fraction [in wt.-%] of the first second propylene polymer fraction, i.e. the polymer produced in the second reactor (R2), MFR(PP1) is the melt flow rate $MFR_2$ (230° C.) [in g/10 min] of the first propylene polymer fraction, i.e. the polymer produced in the first reactor (R1), MFR(PP) is the melt flow rate $MFR_2$ (230° C.) [in g/10 min] of the first and second propylene polymer fractions, i.e. the polymer produced in the first and second reactor (R1+R2), MFR(PP2) is the calculated melt flow rate $MFR_2$ (230° C.) [in g/10 min] of the first propylene polymer fraction, i.e. the polymer produced in the second reactor (R2).

Calculation of the intrinsic viscosity of the xylene soluble fraction of the first elastomeric propylene copolymer fraction, i.e. the polymer fraction produced in the third reactor (R3), of the second heterophasic propylene copolymer (HECO2):

$$\frac{IV(PP) - XCS(PP12) \times W(PP12)}{XCS(PP3)} = IV(PP3) \quad \text{(XI)}$$

wherein

XCS(PP12) is the xylene soluble fraction [in wt.-%] of the first and second propylene polymer fractions, i.e. the polymer produced in the first and second reactor (R1+R2), XCS(PP3) is the xylene soluble fraction [in wt.-%] of the first elastomeric propylene copolymer fraction, i.e. the polymer produced in the third reactor (R3), IV(PP12) is the intrinsic viscosity [in dl/g] of the xylene soluble fraction of the first and second propylene polymer fractions, i.e. the polymer produced in the first and second reactor (R1+R2), IV(PP) is the intrinsic viscosity [in dl/g] of the xylene soluble fraction of the first and second propylene polymer fractions and the first elastomeric propylene copolymer fraction, i.e. polymer produced in the first, second and third reactor (R1+R2+R3), IV(PP3) is the calculated intrinsic viscosity [in dl/g] of the xylene soluble fraction of the first elastomeric propylene copolymer fraction, i.e. the polymer produced in the third reactor (R3).

Calculation of the intrinsic viscosity of the xylene soluble fraction of the second elastomeric propylene copolymer fraction, i.e. the polymer fraction produced in the fourth reactor (R4), of the second heterophasic propylene copolymer (HECO2):

$$\frac{IV(PP) - XCS(PP123) \times W(PP123)}{XCS(PP4)} = IV(PP4) \quad \text{(XII)}$$

wherein

XCS(PP123) is the xylene soluble fraction [in wt.-%] of the first and second propylene polymer fractions and the first elastomeric propylene copolymer fraction, i.e. the polymer produced in the first, second and third reactor (R1+R2+R3), XCS(PP4) is the xylene soluble fraction [in wt.-%] of second elastomeric propylene copolymer fraction, i.e. the polymer produced in the fourth reactor (R4), IV(PP123) is the intrinsic viscosity [in dl/g] of the xylene soluble fraction of the first and second propylene polymer fractions and the first elastomeric propylene copolymer fraction, i.e. the polymer produced in the first, second and third reactor (R1+R2+R3), IV(PP) is the intrinsic viscosity [in dl/g] of the xylene soluble fraction of the first and second propylene polymer fractions and the first and second elastomeric propylene copolymer fractions, i.e. polymer produced in the first, second, third and fourth reactor (R1+R2+R3+R4), IV(PP4) is the calculated intrinsic viscosity [in dl/g] of the xylene soluble fraction of the second elastomeric propylene copolymer fraction, i.e. the polymer produced in the fourth reactor (R4).

Calculation of comonomer content of the elastomeric propylene copolymer fraction, i.e. the polymer fraction produced in the third and fourth reactor (R3+R4), of the second heterophasic propylene copolymer (HECO2):

$$\frac{C(HECO) - w(PP12) \times C(PP12)}{w(E)} = C(E) \quad \text{(XIII)}$$

wherein w(PP12) is the weight fraction [in wt.-%] of the first and second propylene polymer fractions, i.e. the polymer produced in the first and second reactor (R1+R2), w(E) is the weight fraction [in wt.-%] of the elastomeric propylene copolymer fraction, i.e. the polymer produced in the third and fourth reactor (R3+R4)

C(PP12) is the comonomer content [in mol-%] of the first and second propylene polymer fractions, i.e. the polymer produced in the first and second reactor (R1+R2), C(HECO) is the comonomer content [in mol-%] of the first and second propylene polymer fractions and the elastomeric propylene copolymer, i.e. polymer produced in the first, second, third and fourth (R1+R2+R3+R4), C(E) is the calculated comonomer content [in mol-%] of the elastomeric propylene copolymer fraction, i.e. the polymer produced in the third and fourth reactor (R3+R4).

$MFR_2$ (230° C.) is measured according to ISO 1133 (230° C., 2.16 kg load).

$MFR_2$ (190° C.) is measured according to ISO 1133 (190° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio defects:

$$P_{total}=P_{12}+P_{21e}$$

The mole percent of 2,1 erythro regio defects was quantified with respect to all propene:

$$[21e] \text{ mol \%}=100*(P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4: 2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL. of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument. DSC analysis, melting temperature (Tm). crystallization temperature (Tc): measured with a TA Instrument Q2000 differential scanning calorimeter (DSC) on 5 to 7 mg samples. DSC run according to ISO 11357/part 3/method C2 in a heat/cool/heat cycle with a scan rate of 10° C./min in the temperature range of −30 to +230° C. Crystallization temperature was determined from the cooling step, while melting temperature was determined from the heating scan.

Intrinsic viscosity is measured according to DIN ISO 1628/1, October 1999 (in Decalin at 135° C.).

Density is measured according to ISO 1183-187. Sample preparation is done by compression moulding in accordance with ISO 1872-2:2007.

The xylene solubles (XCS, wt.-%): Content of xylene cold solubles (XCS) is determined at 25° C. according ISO 16152; first edition; 2005 Jul. 1. The part which remains insoluble is the xylene cold insoluble (XCI) fraction.

Flexural Modulus: The flexural modulus was determined in 3-point-bending according to ISO 178 on 80×10×4 mm³ test bars injection molded at 23° C. in line with EN ISO 1873-2.

Charpy notched impact test: The charpy notched impact strength (Charpy NIS) was measured according to ISO 179 2C/DIN 53453 at 23° C. and −20° C., using injection molded bar test specimens of 80×10×4 mm prepared in accordance with ISO 294-1:1996

Shrinkage in flow and shrinkage cross flow were determimed on film gate injection moulded plaques: One is a sector (radius 300 mm and opening angle of 20°) and the other one a stripe (340×65 mm). The two specimens are injection moulded at the same time in different thicknesses and back pressures (2 mm and 300, 400, 500 bars; 2.8 mm and 300, 400, 500 bars; 3.5 mm and 300, 400, 500 bars). The melt temperature is 240° C. and the temperature of the tool 25° C. Average flow front velocity is 3.0±0.2 mm/s for the 2 mm tool, 3.5±0.2 mm/s for the 2.8 mm tool and 0.0±0.2 mm/s for the 3.5 mm tool.

After the injection moulding process the shrinkage of the specimens is measured at 23° C. and 50% humidity. The measurement intervals are 1, 4, 24, 48 and 96 hours after the injection moulding. To determine the shrinkage 83 and 71 measurement points (generated by eroded dots on the tool surface) of the sector and the stripe, respectively, are recorded with a robot. Both, in flow and cross flow shrinkage of the 2.8 mm thick plates exposed to a back pressure of 400 bars at 96 hours after the injection moulding process are reported as final results.

Surface Appearance of Compact and Foamed Parts

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:

1. Image Recording

The basic principle of the measurement system is to illuminate the plates with a defined light source (LED) in a closed environment and to record an image with a CCD-camera system.

A schematic setup is given in the FIGURE.

2. Image Analysis

The specimen is floodlit from one side and the upwards reflected portion of the light is deflected via two mirrors to a CCD-sensor. The such created grey value image is analyzed in lines. From the recorded deviations of grey values the mean square error average (MSEaverage) or mean square error maximum (MSEmax) values are calculated allowing a quantification of surface quality/homogeneity, i.e. the higher the MSE value the more pronounced is the surface defect. MSEaverage and MSEmax values are not comparable. Generally, for one and the same material, the tendency to flow marks increases when the injection speed is increased.

The MSEaverage values were collected on compact injection-moulded plaques 440×148×2.8 mm produced with grain G1. The plaques were injection-moulded with different filling times of 1.5, 3 and 6 sec respectively.

Further Conditions:
Melt temperature: 240° C.
Mould temperature 30° C.
Dynamic pressure: 10 bar hydraulic The MSEmax values were collected on compact injection-moulded plaques 210×148×2 mm produced with a one-point gating system and a grain marked here as G2, which differs from G1. The plaques were injection-moulded with filling time of 1.5 s.

The foamed parts were prepared by adding the corresponding foaming agent (see table 1 below) during the conversion step.

Cell structure of the foamed parts was determined by light microscopy and computer tomography from a cross-section of the foamed injection-moulded plate. The computer tomography scans were performed at a laboratory system Nanotom 180 NF (GE Phoenix|x-ray, Wunstorf, Germany). Since a matrix detector (Hamamatsu 2300×2300 pixels) was used, the system works in cone beam geometry. The Voxel edge length was set to 5 μm and 1700 projection images were collected. To reduce noise and motion artefacts, 6 images at each angular position were read out with the first image to be skipped and the other 5 images to be averaged and saved to disc.

Maximum force at break was determined on plaques with dimensions 148×148×2 mm during instrumented falling weight impact testing according to ISO 6603-2. The test was performed at room temperature with a lubricated tup with a diameter of 20 mm and impact velocity of 10 mm/s. The maximum force at break was determined as the maximum peak at the force-deformation curve collected during the test.

Compression test was performed on 10×10×2 mm plaques at room temperature according to ISO 604: 2002. The tests were carried out on a Zwick Z010U machine with a test speed of 0.87 mm/min at room temperature. The compressive stress was determined at 1 mm deformation. Thus, the compressive stress is defined as the force at break at 1 mm deformation divided by the specimen area at the beginning of the experiment.

Total carbon emission was determined according to VDA 277:1995 from pellets. The Total Volatiles value is the total emission of organic carbon, determined according to the method in VDA 277. This value represents the amount of organic compounds which are emitted by a test sample which compounds can be found in the interior of a car.

Total emission was determined according to ISO12219-4 (Daimler AG standard) in a 1 m³ emission test chamber VCE 2000 (Vötsch Industrietechnik GmbH, Bahlingen) fitted with a FID type MD 123 I/1VE (Testa GmbH, Munich).

Odour was determined according to VDA 270:1992 according to variant 3 from pellets with a panel of 7 people.

2. Examples

The following inventive example IE1 as well as comparative examples CE1, CE2 and CE3 and the reference were prepared by melt blending the components set out in table 1 (without the foaming agent) on a co-rotating twin screw extruder. The polymer melt mixture was discharged and pelletized. Subsequently, compacted and foamed injection-moulded plaques 210×148×2 mm were produced with a one-point gating system. The plaques were injection-moulded with a filling time of 0.8 s. The foaming agent was added for IE1 and CE1, CE2 and CE3 during the conversion step.

TABLE 1

Overview of the composition for inventive example IE and comparative examples C1, CE2 and CE3 as well as the compacted reference

| | | IE foamed | CE1 foamed | CE2 foamed | CE3 foamed | Reference compacted |
|---|---|---|---|---|---|---|
| HECO1 | [wt.-%] | 38 | 38 | 38 | 38 | 38 |
| HECO2 | [wt.-%] | 26.5 | 26.5 | 26.5 | 26.5 | 26.5 |

TABLE 1-continued

Overview of the composition for inventive example IE and comparative examples C1, CE2 and CE3 as well as the compacted reference

| | | IE foamed | CE1 foamed | CE2 foamed | CE3 foamed | Reference compacted |
|---|---|---|---|---|---|---|
| PL | [wt.-%] | 8 | 8 | 8 | 8 | 8 |
| HDPE | [wt.-%] | 5 | 5 | 5 | 5 | 5 |
| Talc | [wt.-%] | 14.5 | 14.5 | 14.5 | 14.5 | 14.5 |
| FA1 | [wt.-%] | 2 | | | | |
| FA2 | [wt.-%] | | 2 | | | |
| FA3 | [wt.-%] | | | 2 | | |
| FA4 | [wt.-%] | | | | 2 | |
| NA | [wt.-%] | 0.1 | 0.1 | 0.1 | 0.1 | 0.1 |
| Additives | [wt.-%] | 7.9 | 7.9 | 7.9 | 7.9 | 7.9 |

HECO1 is the commercial heterophasic propylene copolymer BJ998MO of Borealis.
HECO2 is the commercial heterophasic propylene copolymer EG066AI of Borealis.
PL is the commercial ethylene-octene copolymer Queo8230 of Borealis having a density of 0.880 g/cm$^3$, a melt flow rate MFR$_2$ (190° C.) of 30.0 g/10 min and an 1-octene content of 7.5 mol-%.
HDPE is the commercial high density polyethylene BorPure™ MB7541 of Borealis.
Talc is the commercial Talc Jetfine 3CA of Luzenac.
FA1 is the commercial foaming agent EE25C of Eiwa.
FA2 is the commercial foaming agent Hydrocerol ITP825 of Clariant.
FA3 is the commercial foaming agent Tracel IM4215 of Tramaco.
FA4 is the commercial foaming agent Tracel PO4135F of Tramaco.
NA is the commercial nucleating agent NA-21 of Adeka Corporation.
Additives is a masterbatch of typical additives such as antioxidants, carbon black, hindered amine light stabilizers, slipping agents, etc.

The properties of the comparative and inventive examples collected on 2 mm compact and chemically injection-moulded foamed plates are set out in table 2 below.

TABLE 2

Properties of comparative and inventive examples collected on 2 mm compact and chemically injection-moulded foamed plates.

| | | IE foamed | CE1 foamed | CE2 foamed | CE3 foamed | Reference compacted |
|---|---|---|---|---|---|---|
| Total carbon emission | [μgC/g] | 88 | 88 | 96 | 83 | 94 |
| Odour (7 persons) | | | | | | |
| -Average | | 3.6 | 4.8 | 5.6 | 4.2 | 3.8 |
| -median | | 4 | 5 | 6 | 5 | 4 |
| MFR2, 230° C. | [g/10 min] | | | | 29.97 | |
| Filler content | [wt.-%] | | | | 14.5 | |
| MSE, 1.5 s | | | | | | 11.6 |
| Total emission according to ISO12219-4 | μg/m$^3$ toluene equivalent | 22100 | 38400 | | | 21200 |
| Appearance foamed part (1-excelllent, 5-bad) | | 2 | 2 | 3 | 4 | 1 |
| Skin thickness foam | [μm] | 200 | 300 | 300 | 300 | — |
| Cell diameter foam | [μm] | 133 | 120 | 120 | 250 | — |

The cell structure of the inventive and comparative examples is also shown in the FIGURE.

The total carbon emissions of the foamed plates were best for CE3, however the odour which is very decisive for interior applications was best for IE, i.e. when using a foaming agent (FA) comprising citric acid in combination with a bicarbonate. Furthermore, IE and CE1 gave the finest foam. The surface of the foamed parts was investigated giving school marks from 1 (excellent surface) to 5 (bad surface) on the grained surface. IE1 and CE1 showed the best results. Altogether, the inventive example IE showed the best combination of surface appearance and mechanical properties as well as sufficient odour and emission properties.

The invention claimed is:

1. A polypropylene composition (C) having a melt flow rate MFR$_2$ (230° C.) determined according to ISO 1133 in the range of 15 to 40 g/10 min, comprising
   a) 35.0 to 55.0 wt.-%, based on the overall polypropylene composition (C), of a first heterophasic propylene copolymer (HECO1) having a melt flow rate MFR$_2$ (230° C.) determined according to ISO 1133 in the range of 60 to 160 g/10 min, said first heterophasic propylene copolymer comprising
      i) a first matrix being a first propylene polymer (M1) and
      ii) a first elastomeric propylene copolymer (E1) dispersed in said first matrix,
   b) ≥20.0 wt.-%, based on the overall polypropylene composition (C), of a second heterophasic propylene copolymer (HECO2) having a melt flow rate MFR$_2$ (230° C.) determined according to ISO 1133 in the range of 3 to <50 g/10 min, said second heterophasic propylene copolymer comprising
      iii) a second matrix, which is a second propylene polymer (M2) and
      iv) a second elastomeric propylene copolymer (E2) dispersed in said second matrix,
   c) 2.0 to 10.0 wt.-%, based on the overall polypropylene composition (C), of a high density polyethylene (HDPE) having a melt flow rate MFR$_2$ (190° C.) determined according to ISO 1133 in the range of 2 to 15 g/10 min,
   d) 5.0 to 15.0 wt.-%, based on the overall polypropylene composition (C), of a plastomer (PL), which is a copolymer of ethylene and a C$_4$ to C$_8$ α-olefin and having a melt flow rate MFR$_2$ (190° C.) determined according to ISO 1133 in the range of 10 to 70 g/10 min,
   e) 1.0 to 20.0 wt.-%, based on the overall polypropylene composition (C), of an inorganic filler (F),
   f) 1.0 to 10.0 wt.-%, based on the overall polypropylene composition (C), of a foaming agent (FA) comprising citric acid in combination with a bicarbonate, and
   g) optionally, a nucleating agent.

2. The polypropylene composition (C) according to claim 1, wherein
   i) the matrix of the first heterophasic propylene copolymer (HECO1) being the first propylene polymer (M1) has a melt flow rate MFR$_2$ (230° C.) determined according to ISO 1133 in the range of 50 to 200 g/10 min, and
   ii) the matrix of the second heterophasic propylene copolymer (HECO2) being the second propylene polymer (M2) has a melt flow rate MFR$_2$ (230° C.) determined according to ISO 1133 in the range of 50 to 200 g/10 min.

3. The polypropylene composition (C) according to claim 1, wherein the first heterophasic propylene copolymer (HECO1) has
   i) a xylene soluble fraction (XCS) in the range of 15.0 to 35.0 wt.-%, and/or
   ii) a xylene soluble fraction (XCS) whose intrinsic viscosity (IV) is <3.5 dl/g at 135° C., and/or
   iii) a xylene soluble fraction (XCS) whose ethylene content is from 30.0 to 40.0 wt.-%, based on the total weight of the xylene soluble fraction (XCS).

4. The polypropylene composition (C) according to claim 1, wherein the second heterophasic propylene copolymer (HECO2) has i) a xylene soluble fraction (XCS) in the range of 10.0 to 35.0 wt.-%, and/or ii) a xylene soluble fraction (XCS) whose intrinsic viscosity (IV) is <4.0 dl/g at 135° C., and/or iii) a xylene soluble fraction (XCS) whose ethylene content is 35.0 to 50.0 wt.-%, based on the total weight of the xylene soluble fraction (XCS).

5. The polypropylene composition (C) according to claim 1, wherein the first propylene polymer (M1) and/or the second propylene polymer (M2) are propylene homopolymers.

6. The polypropylene composition (C) according to claim 1, wherein the first elastomeric propylene copolymer (E1) and/or the second elastomeric propylene copolymer (E2) are copolymers of propylene and ethylene.

7. The polypropylene composition (C) according to claim 1, wherein the plastomer (PL)

i) is a copolymer of ethylene and 1-octene, and/or ii) has a density of below 0.900 g/cm$^3$.

8. The polypropylene composition (C) claim 1, wherein the inorganic filler (F) is talc and/or wollastonite.

9. The polypropylene composition (C) according to claim 1, wherein the bicarbonate is selected from the group consisting of sodium bicarbonate, potassium bicarbonate, magnesium bicarbonate, calcium bicarbonate, ammonium bicarbonate, and mixtures thereof.

10. The polypropylene composition (C) according to claim 9, wherein the bicarbonate is sodium bicarbonate.

11. The polypropylene composition (C) according to claim 1, wherein said polypropylene composition (C) is a foamable polypropylene composition.

12. A foamed article comprising the polypropylene composition (C) according to claim 1.

13. The foamed article according to claim 12, wherein said foamed article is an automotive article.

* * * * *